(12) United States Patent
Jung et al.

(10) Patent No.: US 12,219,176 B2
(45) Date of Patent: *Feb. 4, 2025

(54) VIDEO SIGNAL PROCESSING METHOD AND APPARATUS USING MULTIPLE TRANSFORM KERNELS

(71) Applicant: SAMSUNG ELECTRONICS CO., LTD., Suwon-si (KR)

(72) Inventors: Jaehong Jung, Seoul (KR); Juhyung Son, Uiwang-Si (KR); Dongcheol Kim, Suwon-Si (KR); Geonjung Ko, Seoul (KR); Jinsam Kwak, Anyang-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,775

(22) Filed: Jul. 14, 2023

(65) Prior Publication Data

US 2024/0015330 A1 Jan. 11, 2024

Related U.S. Application Data

(63) Continuation of application No. 18/146,597, filed on Dec. 27, 2022, which is a continuation of application (Continued)

(30) Foreign Application Priority Data

| Sep. 7, 2018 | (KR) | ........................ 10-2018-0107430 |
| Oct. 6, 2018 | (KR) | ........................ 10-2018-0119444 |
| Oct. 12, 2018 | (KR) | ........................ 10-2018-0121515 |

(51) Int. Cl.
*H04N 19/176* (2014.01)
*H04N 19/12* (2014.01)
(Continued)

(52) U.S. Cl.
CPC ........... *H04N 19/625* (2014.11); *H04N 19/12* (2014.11); *H04N 19/176* (2014.11); *H04N 19/61* (2014.11)

(58) Field of Classification Search
CPC .... H04N 19/119; H04N 19/12; H04N 19/129; H04N 19/176; H04N 19/18; H04N 19/61; H04N 19/625; H04N 19/70
See application file for complete search history.

(56) References Cited

U.S. PATENT DOCUMENTS

| 8,531,544 B2 | 9/2013 | Alacoque |
| 2019/0281298 A1 | 9/2019 | Ohkawa |

(Continued)

FOREIGN PATENT DOCUMENTS

| KR | 10-1805531 B1 | 1/2018 |
| WO | 2017023152 A1 | 2/2017 |

(Continued)

OTHER PUBLICATIONS

International Search Report of International Application No. PCT/KR2019/011621, dated Dec. 20, 2019.

(Continued)

*Primary Examiner* — Jessica M Prince
(74) *Attorney, Agent, or Firm* — Sughrue Mion, PLLC

(57) ABSTRACT

A video signal processor is configured to: obtain at least one transform block for a residual signal of a current block from a video signal bitstream, wherein the transform block comprises a plurality of transform coefficients two-dimensionally arranged, determine, on the basis of length information of a first side of the transform block, a horizontal transform kernel for horizontal transformation of the transform block, regardless of a length of a second side of the transform block, which is orthogonal to the first side, determine, on the basis of length information of the second side, a vertical
(Continued)

transform kernel for vertical transformation of the transform block, regardless of a length of the first side, obtain the residual signal of the current block by performing, on the transform block, inverse transformation using the horizontal transform kernel and the vertical transform kernel, and reconstruct the current block based on the residual signal.

9 Claims, 17 Drawing Sheets

Related U.S. Application Data

No. 17/697,811, filed on Mar. 17, 2022, now Pat. No. 11,570,478, which is a continuation of application No. 17/185,683, filed on Feb. 25, 2021, now Pat. No. 11,317,118, which is a continuation of application No. PCT/KR2019/011621, filed on Sep. 9, 2019.

(51) Int. Cl.
*H04N 19/61* (2014.01)
*H04N 19/625* (2014.01)

(56) References Cited

U.S. PATENT DOCUMENTS

| | | |
|---|---|---|
| 2019/0356915 A1 | 11/2019 | Jang |
| 2019/0387241 A1 | 12/2019 | Kim |
| 2020/0177901 A1* | 6/2020 | Choi ............... H04N 19/12 |
| 2021/0084314 A1* | 3/2021 | Salehifar ............... H04N 19/184 |
| 2021/0218996 A1* | 7/2021 | Koo ............... H04N 19/176 |
| 2022/0182651 A1 | 6/2022 | Kim |

FOREIGN PATENT DOCUMENTS

| | | |
|---|---|---|
| WO | 2018101288 A1 | 6/2018 |
| WO | 2018128323 A1 | 7/2018 |

OTHER PUBLICATIONS

Written Opinion of International Application No. PCT/KR2019/011621, dated Dec. 20, 2019.
Jianle Chen et al. Algorithm description for Versatile Video Coding and Test Model 2 (VTM 2), Joint Video Experts Team (JVET) of ITU-T SG 16 WP 3 and ISO/IEC JTC 1/SC 29/WG 11, JVET-KI002-v2, Jul. 18, 2018.
Office Action from Intellectual Property India for Application No. 202127008805, dated Jan. 21, 2022.
Notice of Allowance of U.S. Appl. No. 17/697,811 from the USPTO dated Dec. 1, 2022.
Non-Final Rejection of U.S. Appl. No. 17/185,683 from the USPTO dated Sep. 1, 2021.
Notice of Allowance of U.S. Appl. No. 17/185,683 from the USPTO dated Dec. 22, 2021.
Communication dated Jan. 12, 2024, issued by Indian Patent Office in Indian Patent Application No. 202127008805.
Communication dated Feb. 28, 2024, issued by Vietnamese Patent Office in Vietnamese Patent Application No. 1-2021-01774.
Communication dated Oct. 22, 2024, issued by the Korean Patent Center in Korean Application No. 10-2021-7005232.
Chen et al., "Algorithm Description of Joint Exploration Test Model 3", JVET of ITU-T and ISO/IEC JTC 1/SC 29/WG 11, JVET-C1001_v2, 2016, pp. 1-34 (37 pages total).
Zhang et al., "Video coding using Variable Block-Size Spatially Varying Transforms", 2009 IEEE International Conference on Acoustics, Speech and Signal Processing, 2009, pp. 905-908 (4 pages total).
Lorcy et al., "Proposed improvements to the Adaptive multiple Core transform", JVET of ITU-T and ISO/IEC JTC 1/SC 29/WG 11, JVET-C0022, 2016, pp. 1-4 (4 pages total).

\* cited by examiner

FIG. 8

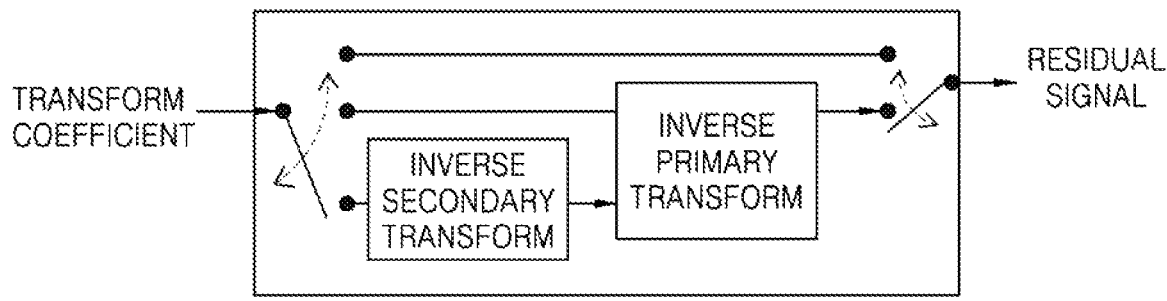

FIG. 9

| Transform Type | Basis function $T_i(j)$, $i,j=0, 1,..., N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$<br>where $\omega_0 = \begin{cases} \sqrt{\frac{2}{N}} & i=0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$,<br>where $\omega_0 = \begin{cases} \sqrt{\frac{2}{N}} & i=0 \\ 1 & i \neq 0 \end{cases}$, $\omega_1 = \begin{cases} \sqrt{\frac{2}{N}} & j=0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

(a)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |
| Intra Mode | 18 | 19 | 20 | 21 | 22 | 23 | 24 | 25 | 26 | 27 | 28 | 29 | 30 | 31 | 32 | 33 | 34 | |
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 0 | 1 | 0 | 1 | 0 | 1 | 0 | 1 | 0 | 1 | 0 | |
| Intra Mode | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |
| Intra Mode | 53 | 54 | 55 | 56 | 57 | 58 | 59 | 60 | 61 | 62 | 63 | 64 | 65 | 66 | | | | |
| V | 2 | 2 | 1 | 0 | 1 | 0 | 1 | 0 | 1 | 0 | 1 | 0 | 1 | 0 | | | | |
| H | 0 | 0 | 1 | 0 | 1 | 0 | 1 | 0 | 1 | 0 | 1 | 0 | 1 | 0 | | | | |

(b)

| Transform Set | Transform Candidates |
|---|---|
| 0 | DST-VII, DCT-VIII |
| 1 | DST-VII, DST-I |
| 2 | DST-VII, DCT-V |

(c)

| Transform Set | Transform Candidates |
|---|---|
| 0 | DCT-VIII, DST-VII |

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

(b)

| Index | Transform Kernel |
|---|---|
| 0 | DCT-II |
| 1 | DST-VII |
| 2 | DCT-VIII |

| | |
|---|---|
| `transform_unit( x0, y0, tbWidth, tbHeight, treeType ) {` | S1401 |
|   if( treeType == SINGLE_TREE \|\| treeType == DUAL_TREE_LUMA ) {<br>    tu_cbf_luma[ x0 ][ y0 ]<br>  if( treeType == SINGLE_TREE \|\| treeType == DUAL_TREE_CHROMA ) {<br>    tu_cbf_cb[ x0 ][ y0 ]<br>    tu_cbf_cr[ x0 ][ y0 ]<br>  } | S1402 |
|   if( ( ( ( CuPredMode[ x0 ][ y0 ] == MODE_INTRA ) && sps_mts_intra_enabled_flag ) \|\|<br>    ( ( CuPredMode[ x0 ][ y0 ] == MODE_INTER ) && sps_mts_inter_enabled_flag ) )<br>    && tu_cbf_luma[ x0 ][ y0 ] && treeType != DUAL_TREE_CHROMA<br>    && ( tbWidth <= 32 ) && ( tbHeight <= 32 ) )<br>    cu_mts_flag[ x0 ][ y0 ] | S1403 |
|   if( tu_cbf_luma[ x0 ][ y0 ] )<br>    residual_coding( x0, y0, log2( tbWidth ), log2( tbHeight ), 0 ) | S1404 |
|   if( tu_cbf_cb[ x0 ][ y0 ] )<br>    residual_coding( x0, y0, log2( tbWidth / 2 ), log2( tbHeight / 2 ), 1 ) | S1405 |
|   if( tu_cbf_cr[ x0 ][ y0 ] )<br>    residual_coding( x0, y0, log2( tbWidth / 2 ), log2( tbHeight / 2 ), 2 )<br>} | S1406 |

(b)

| | |
|---|---|
| `residual_coding( x0, y0, log2TbWidth, log2TbHeight, cIdx ) {` | |
|   if( transform_skip_enabled_flag && ( cIdx != 0 \|\| cu_mts_flag[ x0 ][ y0 ] == 0 ) &&<br>    ( log2TbWidth <= 2 ) && ( log2TbHeight <= 2 ) )<br>    transform_skip_flag[ x0 ][ y0 ][ cIdx ] | S1407 |
| : (Residual Coding Syntax) | |
|   if( cu_mts_flag[ x0 ][ y0 ] && ( cIdx == 0 ) &&<br>    !transform_skip_flag[ x0 ][ y0 ][ cIdx ] &&<br>    ( ( CuPredMode[ x0 ][ y0 ] == MODE_INTRA && numSigCoeff > 2 ) \|\|<br>    ( CuPredMode[ x0 ][ y0 ] == MODE_INTER ) ) )<br>    mts_idx[ x0 ][ y0 ]<br>} | S1408 |

*FIG. 14*

| | |
|---|---|
| `residual_coding( x0, y0, log2TbWidth, log2TbHeight, cIdx ) {` | |
|   if( transform_skip_enabled_flag && ( cIdx != 0 \|\| cu_mts_flag[ x0 ][ y0 ] == 0 ) &&<br>    ( log2TbWidth <= 2 ) && ( log2TbHeight <= 2 ) )<br>    transform_skip_flag[ x0 ][ y0 ][ cIdx ] | S1501 |
| : (Residual Coding Syntax) | |
|   if( cu_mts_flag[ x0 ][ y0 ] && ( cIdx == 0 ) &&<br>    ( ( CuPredMode[ x0 ][ y0 ] == MODE_INTRA && numSigCoeff > 2 ) \|\|<br>    ( CuPredMode[ x0 ][ y0 ] == MODE_INTER ) ) )<br>    mts_idx[ x0 ][ y0 ]<br>} | S1502 |

*FIG. 15*

| cu_mts_flag | mts_idx | Intra | | Inter | |
|---|---|---|---|---|---|
| | | Horizontal | Vertical | Horizontal | Vertical |
| 0 | -1 | DST7 if width < height, else DCT2 | DST7 if height < width, else DCT2 | DCT2 | |
| 1 | 0 | DST7 | DST7 | DST7 | DST7 |
| | 1 | DCT8 | DST7 | DCT8 | DST7 |
| | 2 | DST7 | DCT8 | DST7 | DCT8 |
| | 3 | DCT8 | DCT8 | DCT8 | DCT8 |

| mts_idx[ xTbY ][ yTbY ] | trTypeHor | trTypeVer |
|---|---|---|
| -1 | 0 | 0 |
| 0 | 1 | 1 |
| 1 | 2 | 1 |
| 2 | 1 | 2 |
| 3 | 2 | 2 |

(b)

| mts_idx[ xTbY ][ yTbY ] | trTypeHor | trTypeVer |
|---|---|---|
| -1 | 0 | 0 |
| 0 | 0 | 1 |
| 1 | 0 | 2 |

(c)

| mts_idx[ xTbY ][ yTbY ] | trTypeHor | trTypeVer |
|---|---|---|
| -1 | 0 | 0 |
| 0 | 1 | 0 |
| 1 | 2 | 0 |

(d)

| mts_idx[ xTbY ][ yTbY ] | trTypeHor | trTypeVer |
|---|---|---|
| -1 | 0 | 0 |

FIG. 19

| mts_idx[ x ][ y ] | CuPredMode[ x ][ y ] == MODE_INTRA | | CuPredMode[ x ][ y ] == MODE_INTER | |
|---|---|---|---|---|
| | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

| mts_idx[ x ][ y ] | trTypeHor | trTypeVer |
|---|---|---|
| -2 | 1 | 1 |
| -1 | 0 | 0 |
| 0 | 1 | 1 |
| 1 | 2 | 1 |
| 2 | 1 | 2 |
| 3 | 2 | 2 |

VIDEO SIGNAL PROCESSING METHOD AND APPARATUS USING MULTIPLE TRANSFORM KERNELS

CROSS-REFERENCE TO RELATED APPLICATIONS

This application is a continuation of U.S. application Ser. No. 18/146,597, which was filed on Dec. 27, 2022, and which is a continuation of U.S. application Ser. No. 17/697, 811, which was filed on Mar. 17, 2022, now issued as U.S. Pat. No. 11,570,478 on Jan. 31, 2023, and which is a continuation of U.S. application Ser. No. 17/185,683, which was filed on Feb. 25, 2021, now issued as U.S. Pat. No. 11,317,118 on Apr. 26, 2022, and which is a continuation of pending PCT International Application No. PCT/KR2019/011621, which was filed on Sep. 9, 2019, and which claims priority under 35 U.S.C 119(a) to Korean Patent Application No. 10-2018-0107430 filed with the Korean Intellectual Property Office on Sep. 7, 2018, Korean Patent Application No. 10-2018-0119444 filed with the Korean Intellectual Property Office on Oct. 6, 2018, and Korean Patent Application No. 10-2018-0121515 filed with the Korean Intellectual Property Office on Oct. 12, 2018. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

An aspect of the present disclosure is to improve the coding efficiency of a video signal. Specifically, an aspect of the present disclosure is to improve the coding efficiency by using a transform kernel suitable for a transform block.

Technical Solution

In order to solve the above problems, the disclosure provides a video signal processing apparatus and a video signal processing method as follows.

An embodiment of the present disclosure provides a video signal processing method including: obtaining at least one transform block for a residual signal of a current block from a video signal bitstream, wherein the transform block includes a plurality of transform coefficients that are two-dimensionally arranged; determining, on the basis of length information of a first side of the transform block, a horizontal transform kernel for horizontal transformation of the transform block, regardless of a length of a second side of the transform block, which is orthogonal to the first side; determining, on the basis of length information of the second side, a vertical transform kernel for vertical transformation of the transform block, regardless of a length of the first side; obtaining the residual signal of the current block, by performing, on the transform block, inverse transformation using the horizontal transform kernel and the vertical transform kernel; and reconstructing the current block on the basis of the obtained residual signal.

An embodiment of the present disclosure provides a video signal processing apparatus including a processor, wherein the processor is configured to: obtain at least one transform block for a residual signal of a current block from a video signal bitstream, wherein the transform block includes a plurality of transform coefficients that are two-dimensionally arranged, determine, on the basis of length information of a first side of the transform block, a horizontal transform kernel for horizontal transformation of the transform block, regardless of a length of a second side of the transform block, which is orthogonal to the first side, determine, on the basis of length information of the second side, a vertical transform kernel for vertical transformation of the transform block, regardless of a length of the first side, obtain the residual signal of the current block by performing, on the transform block, inverse transformation using the horizontal transform kernel and the vertical transform kernel, and reconstruct the current block on the basis of the obtained residual signal.

The horizontal transform kernel and the vertical transform kernel may be determined independently of each other according to the length of the first side corresponding to a horizontal direction of the transform block and the length of the second side corresponding to a vertical direction of the transform block, respectively.

The length of the first side may be a width of the transform block, and the length of the second side may be a height of the transform block.

The processor determines the horizontal transform kernel on the basis of whether the length of the first side has a value within a preconfigured range, and may determine the vertical transform kernel on the basis of whether the length of the second side has a value within the preconfigured range.

If one of the length of the first side and the length of the second side has a value outside the preconfigured range, and the other has a value within the preconfigured range, the horizontal transform kernel and the vertical transform kernel may be different from each other.

One of the horizontal transform kernel and the vertical transform kernel may be a first transform kernel and the other may be a second transform kernel.

The first transform kernel may be a discrete cosine transform type 2 (DCT-2)-based transform kernel, and the second transform kernel may not be the DCT-2-based transform kernel.

The second transform kernel may be a discrete sine transform type 7 (DST-7)-based transform kernel.

The second transform kernel may be one of the DST-7-based transform kernel or a discrete cosine transform type 8 (DCT-8)-based transform kernel.

If the length of the first side has a value outside the preconfigured range, and the length of the second side has a value within the preconfigured range, the horizontal transform kernel may be the first transform kernel, and the vertical transform kernel may be the second transform kernel.

If the length of the second side has a value outside the preconfigured range, and the length of the first side has a value within the preconfigured range, the vertical transform kernel may be the first transform kernel, and the horizontal transform kernel may be the second transform kernel.

The preconfigured range may represent a preconfigured length or shorter. If one of the length of the first side and the length of the second side is longer than the preconfigured length, and the other is shorter than or equal to the preconfigured length, the horizontal transform kernel and the vertical transform kernel may be different from each other.

An embodiment of the present disclosure provides a video signal encoding apparatus including a processor, wherein the processor performs, on a residual signal corresponding to at least one transform area of a current block, transformation using a horizontal transform kernel and a vertical transform kernel, and generates a transform block for the residual signal of the current block, wherein: the transform block includes a plurality of transform coefficients that are two-dimensionally arranged; a bitstream is generated by encoding the generated transform block; the horizontal transform kernel is determined regardless of a length of a second side of the transform block, which is orthogonal to a first side, on the basis of length information of the first side of the transform block; and the vertical transform kernel is determined regardless of a length of the first side on the basis of length information of the second side.

An embodiment of the present disclosure provides a non-transitory computer-readable medium that stores a bitstream, wherein: the bitstream includes a plurality of transform coefficients encoded from a residual signal of a current block; the plurality of transform coefficients are two-dimensionally arranged in at least one transform block for the residual signal of the current block, and are reconstructed to the residual signal via inverse transformation using a horizontal transform kernel and a vertical transform kernel; the horizontal transform kernel is determined regardless of a length of a second side of the transform block, which is orthogonal to a first side, on the basis of length information of the first side of the transform block; and the vertical transform kernel is determined regardless of a length of the first side on the basis of length information of the second side.

Advantageous Effects

According to an embodiment of the present disclosure, the coding efficiency of a video signal may be improved. According to an embodiment of the present disclosure, a transform kernel suitable for a current transform block may be selected.

BRIEF DESCRIPTION OF THE DRAWINGS

FIG. 8 is a diagram specifically illustrating a method for obtaining a residual signal by inverse transforming a transform coefficient by an encoder and a decoder.

FIG. 9 is a diagram illustrating a basis function corresponding to each transform type.

FIG. 12 is a diagram illustrating a method of configuring a transform candidate set according to a prediction mode of a current block.

FIG. 13 illustrates a horizontal transform kernel and a vertical transform kernel determined according to a set index.

FIG. 14 is a diagram illustrating a method of obtaining transformation-related information.

FIG. 15 is a diagram illustrating a residual coding syntax according to another embodiment of the present disclosure.

FIG. 18 is a diagram illustrating a method of determining a transform kernel on the basis of a shape of a transform block.

FIG. 19 is a diagram illustrating a method of signaling information indicating a combination of a horizontal transform kernel and a vertical transform kernel.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
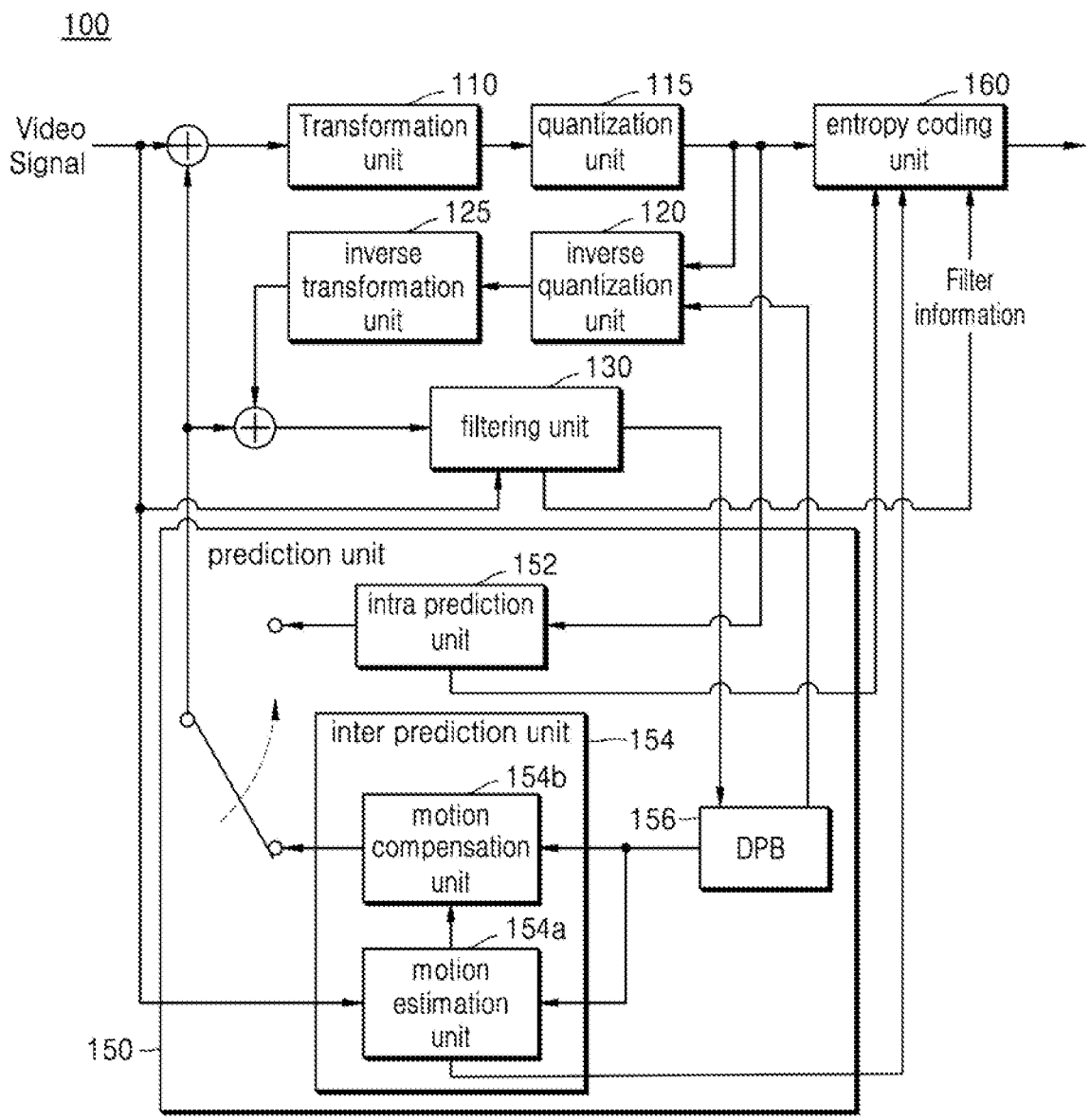
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intro encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
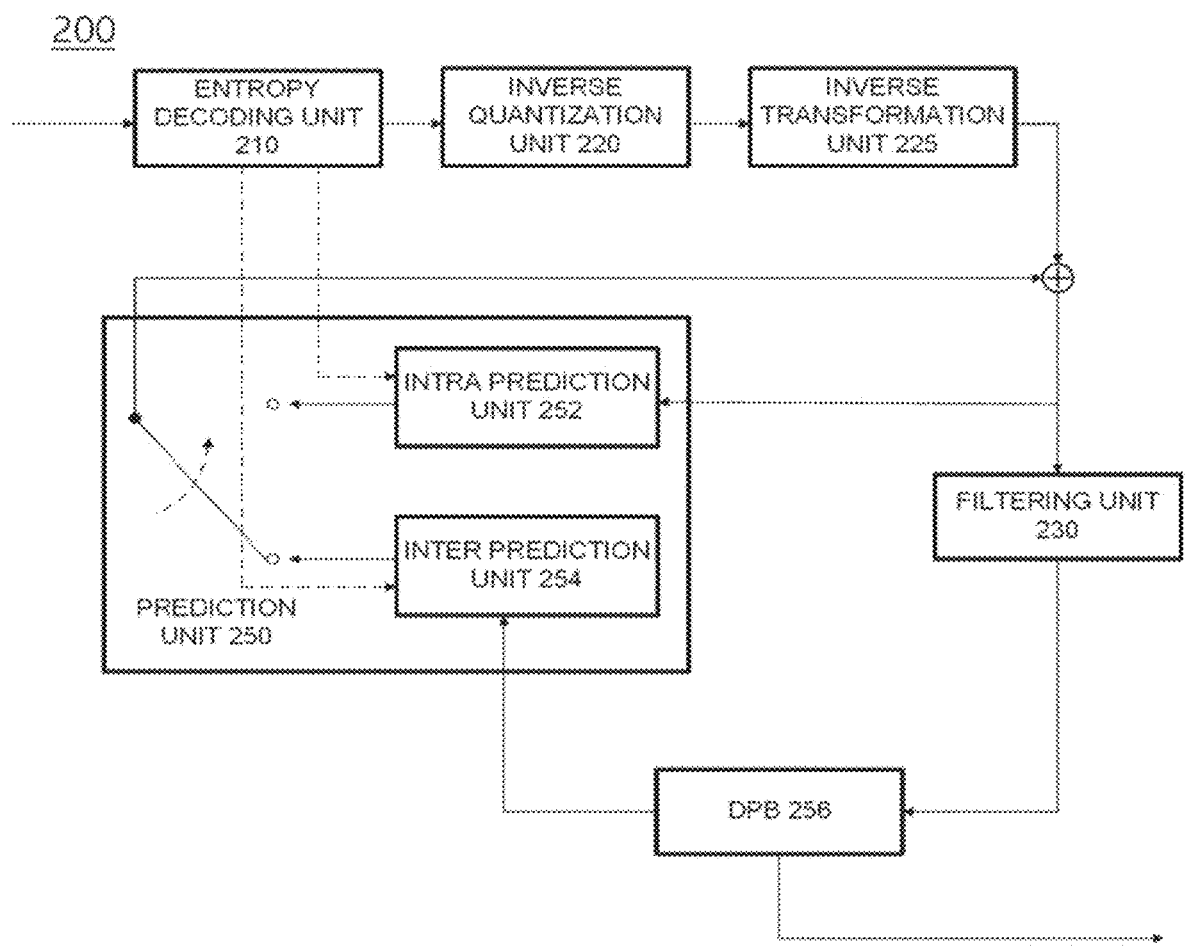
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the lef and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and alter the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
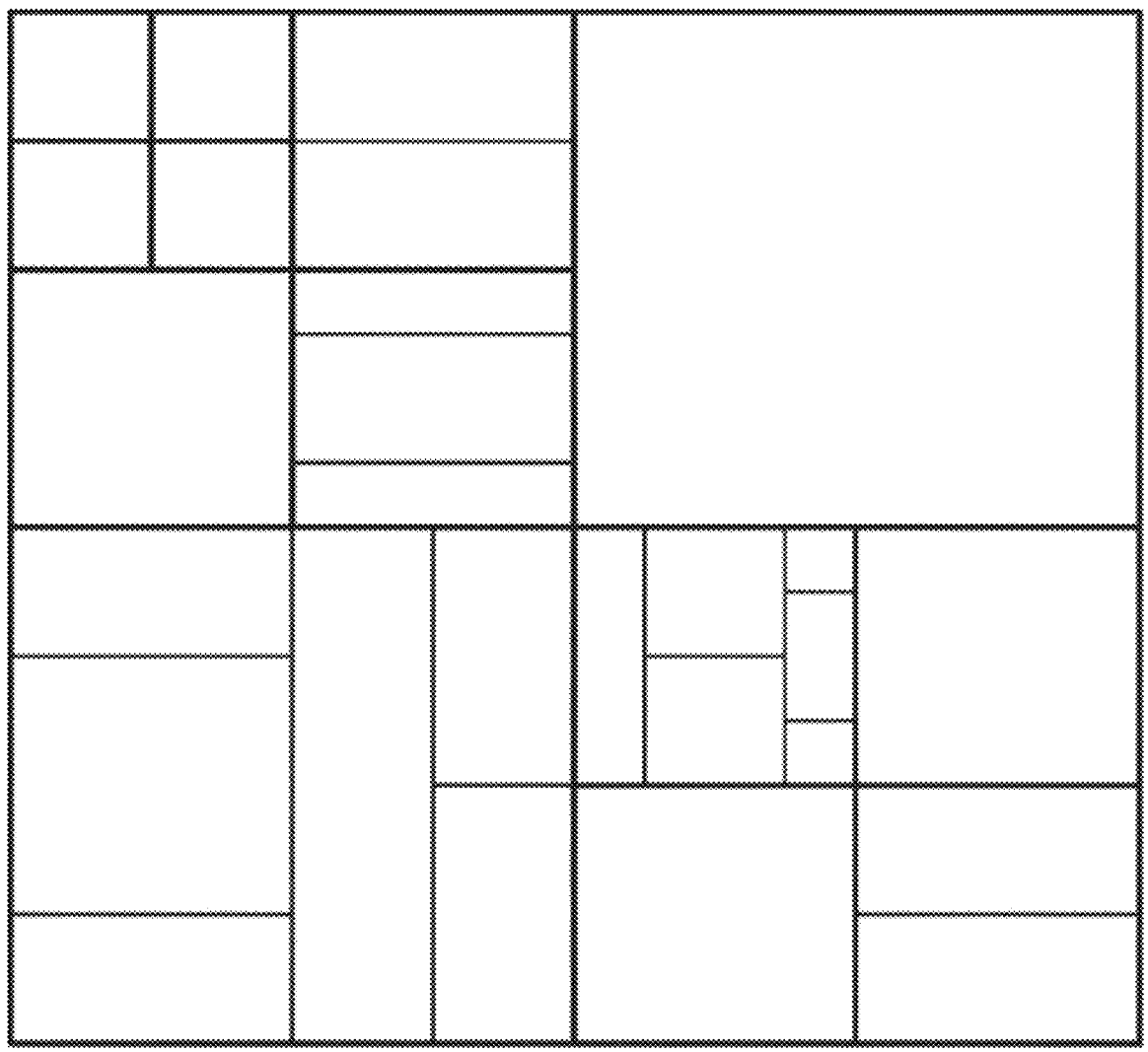
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split may be performed recursively.

The leaf node of the multi-type tree may be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
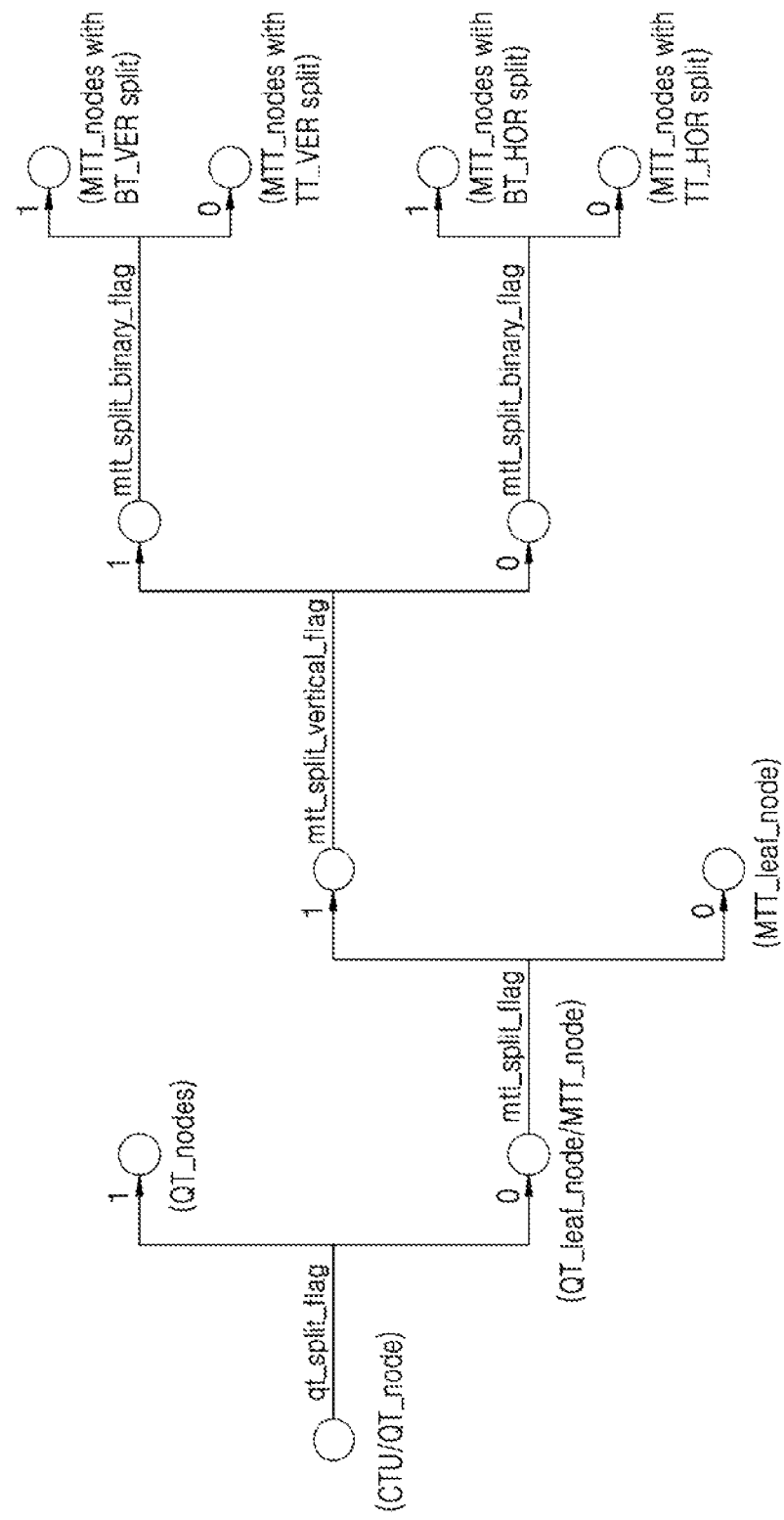
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
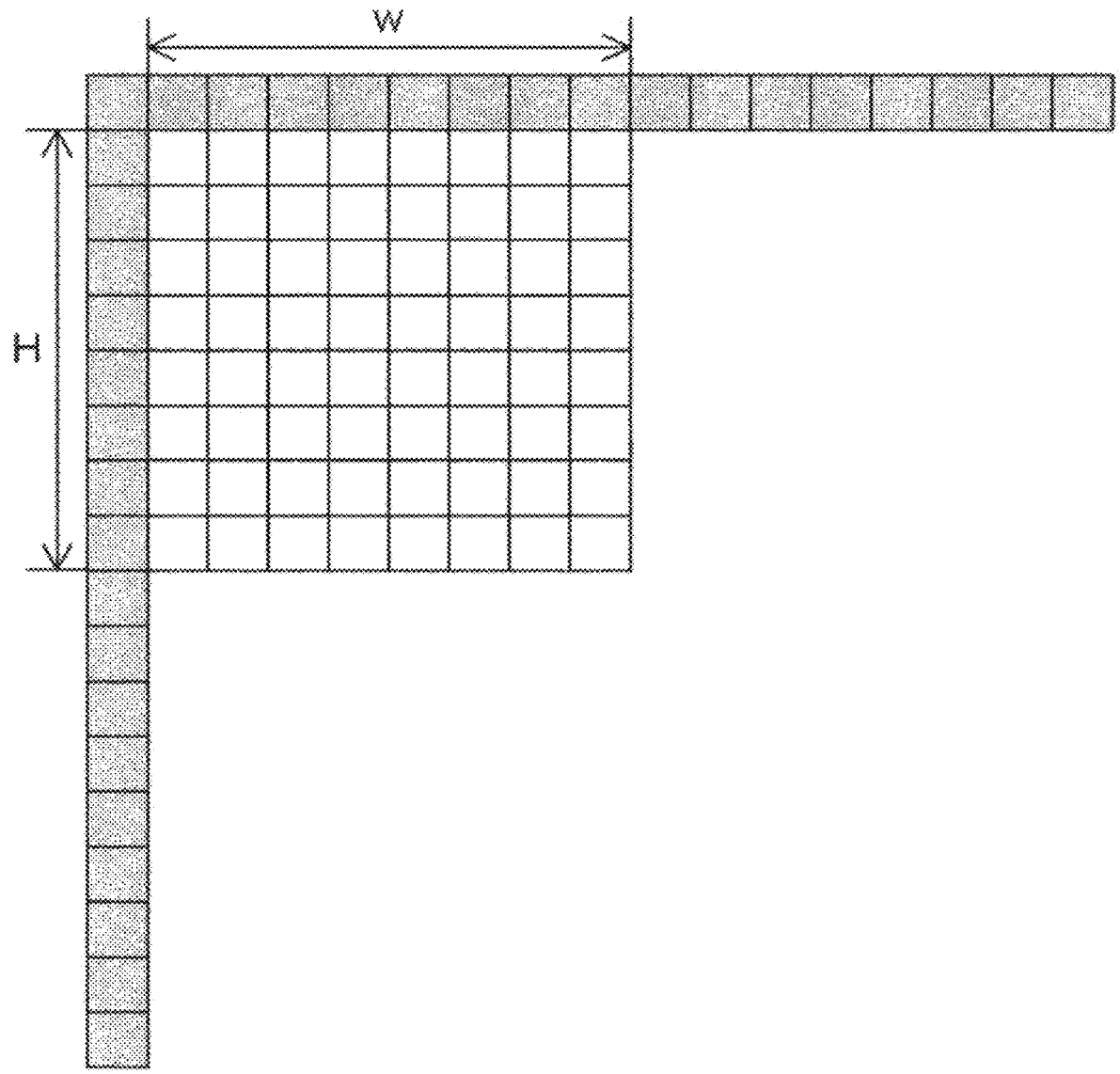
FIGS. 5 and 6 illustrate an intra-prediction method in more detail according to an embodiment of the present disclosure.
Figure 6:
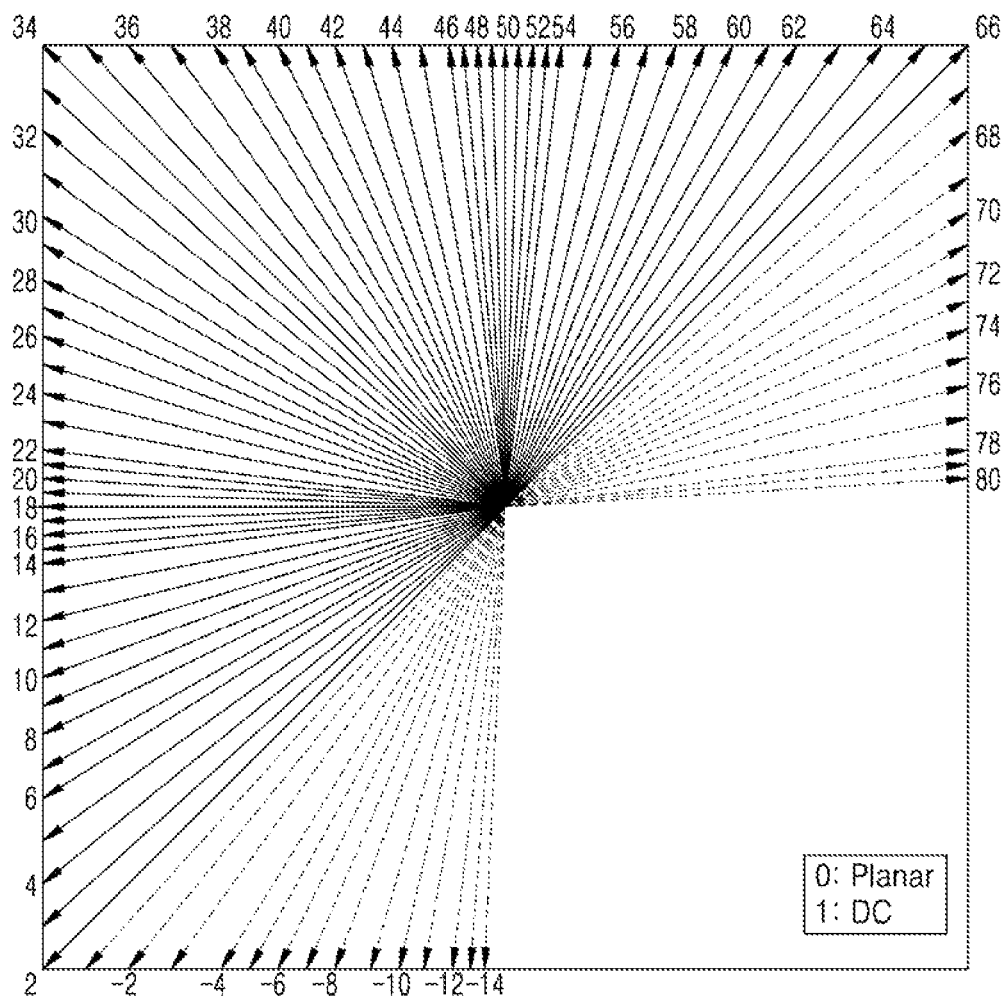

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is WXH and samples of a single reference line adjacent to the current block are used for intra prediction, reference samples may be configured using a maximum of 2W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 7:
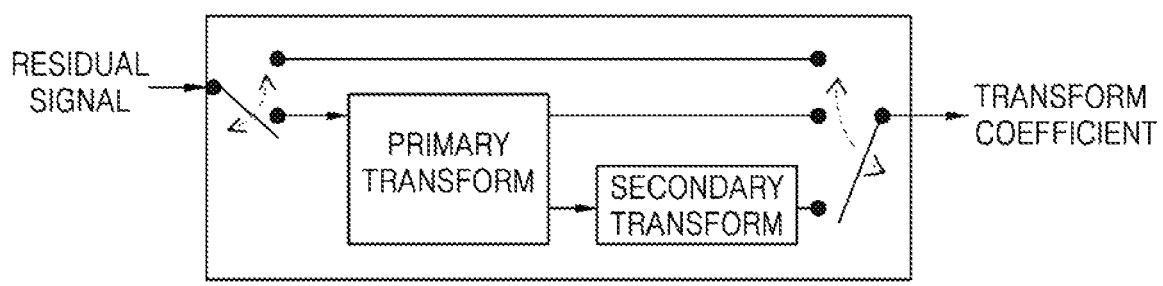
FIG. 7 is a diagram specifically illustrating a method for transforming a residual signal by an encoder.

FIG. 7 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform. A method of selecting one of a plurality of available transform kernels will be described later with reference to FIG. 12 to FIG. 26.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 7, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform secondary transform may be determined depending on the size of the current block or the size of the residual block. Transform kernels having different sizes may be used depending on the size of the current block or the size of the residual block. For example, 8×8 secondary transform may be applied to a block in which a length of a shorter side between a width or a height is shorter than a first preconfigured length. Further, 4×4 secondary transform may be applied to a block in which the length of the shorter side between the width or the height is longer than a second preconfigured length. Here, the first preconfigured length may be a value larger than the second preconfigured length, but the present disclosure is not limited thereto. Unlike primary transform, secondary transform may not be performed separately into vertical transform and horizontal transform. This secondary transform may be referred to as a low frequency band non-separable transform (low frequency non-separable transform, LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 7 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

FIG. 8 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

A distribution of a residual signal of a picture may be different for each area. For example, for a residual signal in a specific area, a distribution of a value may vary according to a prediction method. When transformation on a plurality of different transform areas is performed using the same transform kernel, coding efficiency may vary for each transform area according to distributions and characteristics of values in the transform areas. Accordingly, when a transform kernel used for transforming a specific transform block is adaptively selected from among the plurality of available transform kernels, coding efficiency may be additionally improved. That is, an encoder and a decoder may be configured to additionally use a transform kernel other than a default transform kernel in transformation of a video signal. A method of adaptively selecting a transform kernel may be referred to as adaptive multiple core transform (AMT) or multiple transform selection (MTS). The method of adaptively selecting a transform kernel will be described later with reference to related drawings. In the present disclosure, for the convenience of description, transform and inverse transform are collectively referred to as transform. A transform kernel and an inverse transform kernel are collectively referred to as a transform kernel.

Hereinafter, multiple transform kernels available for transformation of a video signal will be described with reference to FIG. 9. According to an embodiment of the present disclosure, a transform kernel may be a kernel derived based on a specific basis function. Each of the multiple different transform kernels may be obtained based on different basis functions. The multiple transform kernels may be obtained based on a basis function corresponding to each of different transform types.

FIG. 9 is a diagram illustrating a basis function corresponding to each transform type. According to an embodiment, a transform kernel available for transformation of a video residual signal may include at least one among a transform kernel based on discrete cosine transform type 2(DCT-II), a transform kernel based on discrete cosine transform type 5 (DCT-V), a transform kernel based on discrete cosine transform type 8 (DCT-VIII), a transform kernel based on discrete sine transform type 1 (DST-I)), and a transform kernel based on a discrete sine transform type 7 (DST-VII).

Referring to FIG. 9, basis functions corresponding to the above-described respective transform types of DCT-II, DCT-V, DCT-VIII, DST-I, and DST-VII may be expressed as cosine or sine functions. For example, the basis functions corresponding to respective DCT-II, DCT-V, and DCT-VIII may be a cosine type function, and the basis functions corresponding to respective DST-I and DST-VII may be a sine type function. The basis function corresponding to a specific transform type may be expressed in the form of a basis function for each frequency bin. For example, a basis function $T_i(j)$ may be a basis function corresponding to an i-th frequency bin. That is, as a value indicated by i is smaller, a basis function corresponding to a lower frequency is indicated. Also, as a value indicated by i is larger, a basis function corresponding to a higher frequency is indicated. In FIG. 9, j may represent an integer between 0 and N−1.

The basis function of $T_i(j)$ may be expressed as a two-dimensional matrix representing an element in a j-th column of an i-th row. In this case, transformation using transform kernels based on the transform types of FIG. 9 has a separable characteristic in performing transformation. That is, transformation on the residual signal may be performed separately in each of a horizontal direction and a vertical direction. For example, transformation using transform matrix T for residual block X may be expressed as matrix operation TXT'. T' refers to a transpose matrix of transform matrix T. Inverse transformation using transform matrix T for transform block Y may be expressed as T'YT.

Values of the transform matrix defined by the basis functions illustrated in FIG. 9 may be in a decimal form rather than an integer form. It may be difficult to implement decimal values in hardware in a video encoding apparatus and a decoding apparatus. Therefore, a transform kernel integer-approximated from an original transform kernel including values in the form of decimals may be used for encoding and decoding of a video signal. The approximated transform kernel including integer values may be generated via scaling and rounding of the original transform kernel. The integer value included in the approximated transform kernel may be a value within a range that is expressible by a preconfigured number of bits. The preconfigured number of bits may be 8 bits or 10 bits. According to the approximation, orthonormal properties of DCT and DST may not be maintained. However, a coding efficiency loss resulting therefrom is not large, and therefore it may be advantageous, in terms of hardware implementation, to approximate the transform kernel in an integer form.

Figure 10:
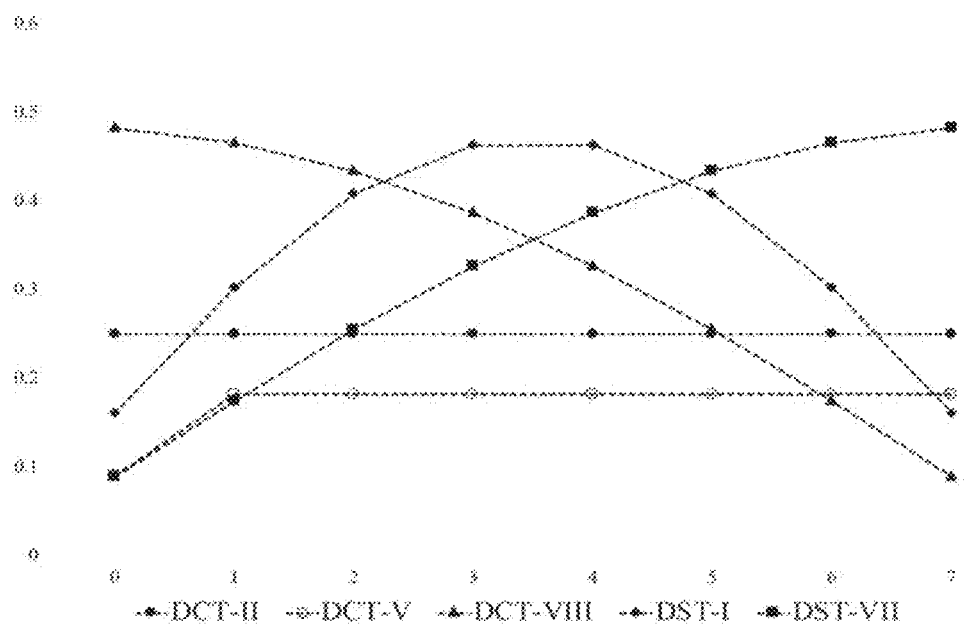
FIG. 10 is a diagram illustrating a signal magnitude for each index of a transform type, such as DCT-II, DCT-V, DCT-VIII, DST-I, and DST-VII.

FIG. 10 is a diagram illustrating a signal magnitude for each index of a transform type, such as DCT-II, DCT-V, DCT-VIII, DST-I, and DST-VII. FIG. 10 illustrates a form of a basis function corresponding to a lowest frequency bin from among basis functions for each frequency bin. FIG. 10 illustrates a basis function corresponding to a 0-th frequency bin from among basis functions for each frequency bin. In FIG. 10, a horizontal axis represents index j (j=0, 1, . . . , N−1) in the basis function, and a vertical axis represents a magnitude value of a signal. N represents the number of samples in a specific area for transformation.

As illustrated in FIG. 10, in DST-VII, as index j increases, a signal magnitude tends to increase. Therefore, like a residual block of an intra-predicted block, DST-VII may be efficient for transformation on a residual block in which a magnitude thereof increases as the distance in the horizontal and vertical directions increases with respect to the upper left of the residual block.

On the other hand, in DCT-VIII, as index j increases, a signal magnitude tends to decrease. That is, DCT-VIII satisfies duality characteristics with DST-VII. Therefore, DCT-VII may be effective for transformation on a residual block in which a magnitude thereof decreases as the distance in the horizontal and vertical directions increases with respect to the upper left of the residual block.

In DST-I, as index j in the basis function increases, a signal magnitude increases, and then the signal magnitude decreases from a specific index. Therefore, DST-I may be efficient for transformation on a residual block having a large magnitude at the center thereof.

A 0-th basis function of DCT-II represents DC. Therefore, it may be efficient for transformation on a residual block having a uniform signal magnitude distribution inside thereof.

DCT-V is similar to DCT-II. However, in DCT-V, a signal magnitude when index j is 0 is smaller than a signal magnitude when index j is not 0. That is, when index j is 1, DCT-V has a signal model in which a straight line is bent.

As described above, when a transform kernel having a separable characteristic is used, transformation may be performed in each of the horizontal and vertical directions of the residual block. Specifically, transformation may be performed on the residual block via two times of a 2D matrix multiplication operation. The matrix multiplication operation may involve an amount of operations, which corresponds to a level equal to or higher than a preconfigured level. Accordingly, when the residual block is transformed using a DCT-II-based transform kernel, the amount of operations may be reduced by using a butterfly structure. However, implementation of DST-VII and DCT-VII may be difficult in terms of the amount of operations, due to relatively high implementation complexity. Accordingly, transform types, which have similar characteristics to those of DST-VII and DCT-VIII, respectively, and have relatively low implementation complexity, may be used.

Figure 11:
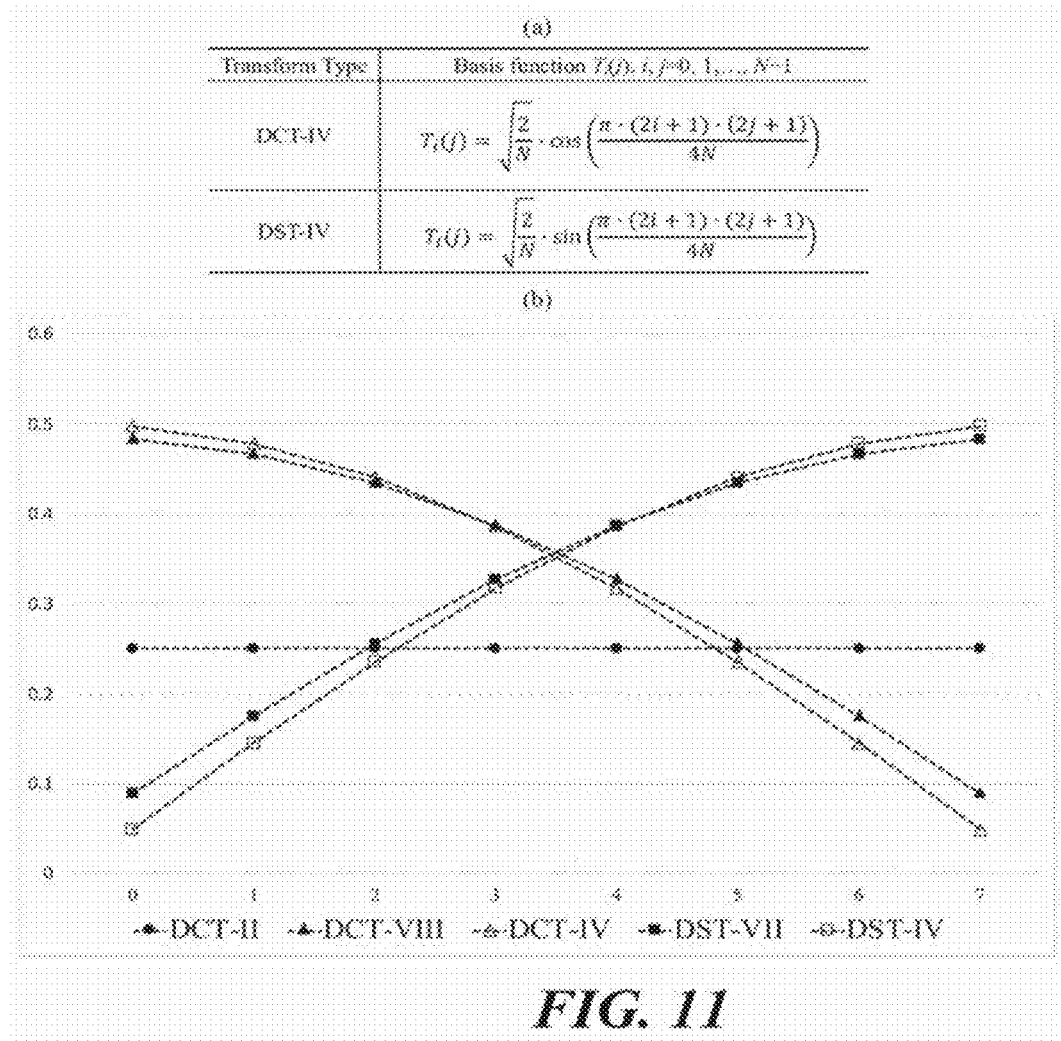
FIG. 11 is a diagram illustrating a signal magnitude for each index of a transform type, such as DST-IV, DCT-IV, DST-VII, and DCT-VIII.

According to an embodiment, discrete sine transform type-IV (DST-IV) and discrete cosine transform type-IV (DCT-IV) may replace DST-VII and DCT-VIII, respectively. FIG. 11 is a diagram illustrating a signal magnitude for each index of a transform type, such as DST-IV, DCT-IV, DST-VII, and DCT-VIII. FIG. 11(a) illustrates a basis function corresponding to DST-IV and a basis function corresponding to DCT-IV. DST-IV and DCT-IV for the number of samples, N, may be derived from DCT-II for the number of samples, 2N. That is, a DCT-II partial butterfly structure for the number of samples, 2N, includes DCT-IV for the number of samples, N. DST-IV for the number of samples, N, may be implemented by arranging a sign inversion operation and a corresponding basis function in reverse order from DCT-IV for the number of samples, N.

As illustrated in FIG. 11(b), DST-IV indicates a signal model similar to that of DST-VII. Therefore, like a residual block of an intra-predicted block, DST-IV may be efficient for transformation on a residual block in which a magnitude thereof increases as the distance in the horizontal and vertical directions increases with respect to the upper left of the residual block. DCT-IV shows a signaling model similar to that of DCT-VIII. Accordingly, DCT-IV may be effective for transformation on a residual block in which a magnitude thereof is large at a specific boundary and decreases when the residual block moves from the specific boundary to another boundary.

When only a transform kernel based on one of the above-described transform types is used for transformation of a video signal, it is difficult to perform adaptive transformation according to a pattern of a residual signal, which varies according to a prediction mode and a characteristic of an original signal. Therefore, in transformation of a residual signal, an encoder and a decoder according to an embodiment of the present disclosure may improve coding efficiency by using a transform kernel selected for each area from among multiple available transform kernels.

In the existing high efficiency video coding (HEVC) standard, a residual signal is transformed using a DCT-II-based transform kernel from among the multiple transform types described above, and a residual signal is transformed by limitedly using a DST-VII-based transform kernel for only an intra-predicted block with the size of 4×4. As described above, DCT-II may be suitable for transformation on a residual signal of an inter-predicted block, but may not be suitable for transformation on a residual signal of an intra-predicted block. That is, according to a method of predicting a current block, a pattern of a residual signal within the residual block may vary.

Accordingly, at least one transform kernel selected from among multiple available transform kernels may be used for transformation of a specific transform block. According to an embodiment, the encoder and the decoder may select a transform kernel for at least one transform area of the current block, on the basis of the method of predicting the current block. This method may be referred to as adaptive multi-core transform (AMT) described above. When a transform kernel determined according to a prediction method for a specific area is used for transformation of the area, coding efficiency may be improved compared to a case where transformation is performed for all areas by using DCT-II-based transform kernel.

FIG. 12 is a diagram illustrating a method of configuring a transform candidate set according to a prediction mode of a current block. According to an embodiment of the present disclosure, an encoder and a decoder may select a transform kernel used for at least one transform area of a current block, on the basis of a transform candidate set corresponding to the current block. The transform candidate set may include multiple candidate transform kernels. The transform candidate set may include different candidate transform kernels according to a prediction mode of the current block.

According to an embodiment, the current block may be a block predicted based on one of multiple intra prediction modes. In this case, a pattern of a residual signal of the current block may vary according to the intra prediction mode used for prediction of the current block. As described above, intra prediction mode information may indicate an intra prediction direction. Accordingly, the pattern of the residual signal of the current block may be changed according to a prediction direction indicated by intra prediction mode information of the current block. The encoder and the decoder may improve coding efficiency by using multiple different transform candidate sets according to the prediction direction.

Accordingly, the encoder and the decoder may determine a transform kernel to be used in a transform area of the current block from a transform candidate set corresponding to the intra prediction mode of the current block. For example, the transform kernel to be used in the transform area may be signaled via a candidate index indicating one of multiple candidate transform kernels included in the transform candidate set. When the transform candidate set corresponding to the intra prediction mode of the current block includes two candidate transform kernels, a candidate index indicating the transform kernel used in the transform area may be expressed as 1-bit.

Different transform candidate sets may be used for each of the vertical and horizontal directions of the transform area. Due to characteristics of the intra prediction method preformed based on directionality, a vertical direction pattern and a horizontal direction pattern of a residual signal of a predicted area may be different from each other. Therefore, a vertical transform kernel and a horizontal transform kernel for a block predicted using a specific intra prediction mode may be obtained from an individual transform candidate set. In the present disclosure, a transform kernel used for vertical transformation of a specific transform area may be referred to as a vertical transform kernel. A transform kernel used for horizontal transformation of a specific transform area may be referred to as a horizontal transform kernel. FIG. 12(a) illustrates transform candidate sets corresponding to 67 intra prediction mode indices, respectively. In FIG. 12(a), V (vertical) denotes a transform candidate set for a vertical transform kernel. H (horizontal) denotes a transform candidate set for a horizontal transform kernel.

FIG. 12(b) illustrates a candidate transform kernel defined according to a transform candidate set. According to an embodiment, a first transform candidate set (e.g., transform set 0 in FIG. 12(b)) may include a candidate transform kernel based on DST-VII and a candidate transform kernel based on DCT-VIII. A second transform candidate set (e.g., transform set 1 in FIG. 12(b)) may include a candidate transform kernel based on DST-VII and a candidate transform kernel based on DST-I. A third transform candidate set (e.g., transform set 2 in FIG. 12(b)) may include a candidate transform kernel based on DST-VII and a candidate transform kernel based on DCT-V. FIG. 12 illustrates that a transform candidate set includes two candidate transform kernels, but the present disclosure is not limited thereto.

According to another embodiment, the current block may be an inter-predicted block. In this case, a transform kernel used in a transform area of the current block may be obtained from a preconfigured transform candidate set. For example, the preconfigured transform candidate set may be one of the above-described multiple transform candidate sets. FIG. 12(c) illustrates a transform candidate set corresponding to a current block, when the current block is an inter prediction block. For example, the preconfigured transform candidate set corresponding to the inter prediction block may include a candidate transform kernel based on DCT-VIII and a candidate transform kernel based on DST-VII. That is, a transform kernel used for the transform area of the inter prediction block may be one of a candidate transform kernel based on DCT-VIII and a candidate transform kernel based on DST-VII.

According to an additional embodiment, the above-described embodiments may be limitedly applied only to a transform block of a luma component. In this case, a preconfigured default transform kernel may be used for a transform block of a chroma component. For example, the default transform kernel may be a DCT-II-based transform kernel.

According to an additional embodiment, the encoder may not signal a candidate index according to the number of non-zero transform coefficients in the transform area. In this case, the decoder may determine a transform kernel by comparing the number of non-zero transform coefficients in the transform area with a preconfigured number. For example, if the number of non-zero transform coefficients is one or two, the candidate index may not be signaled. In this case, an inverse transform unit may perform transformation on the corresponding area by using a preconfigured transform kernel. The preconfigured transform kernel may be a DST-VII-based transform kernel.

FIG. 13 illustrates a horizontal transform kernel and a vertical transform kernel determined according to a set index. According to an embodiment of the present disclosure, information indicating a transform kernel for a residual signal of a specific area from among multiple available transform kernels may be signaled. In this case, information indicating one of the multiple available transform kernels may be signaled regardless of a prediction mode corresponding to the corresponding area. For example, an encoder may signal transform kernel information indicating the transform kernel for the residual signal of the specific area. A decoder may obtain the transform kernel for the corresponding area by using the signaled transform kernel information. The transform kernel information may include at least one of information indicating a horizontal transform kernel of the area or information indicating a vertical transform kernel of the area. This method may be referred to as multiple transform selection (MTS) described above.

The transform kernel may be indicated by one of kernel indices indicating the multiple available transform kernels, respectively. According to an embodiment, a transform kernel corresponding to kernel index "0" may be a DCT-II-based transform kernel, a transform kernel corresponding to kernel index "1" may be a DST-VII-based transform kernel, and a transform kernel corresponding to kernel index "2" may be a DCT-VII-based transform kernel.

According to an embodiment, transform kernel information may be a set index indicating a transform kernel set. The transform kernel set may represent a combination of a transform kernel to be used as a vertical transform kernel and a transform kernel to be used as a horizontal transform kernel. The set index may indicate a combination of a kernel index indicating a horizontal transform kernel and a kernel index indicating a vertical transform kernel. Referring to FIG. 13(a), when transform kernel information of a specific area indicates a set index indicating a first transform kernel set (for example, in the case of FIG. 13(a) where tu_mts_idx [x0][y0] is 0), a vertical transform kernel of the area may be a transform kernel corresponding to kernel index "0". A horizontal transform kernel of the area may be a transform kernel corresponding to kernel index "0".

FIG. 13(b) illustrates a transform kernel corresponding to a kernel index. Referring to FIG. 13(b), a transform kernel corresponding to first kernel index "0" may indicate a DCT-II-based transform kernel. Referring to FIG. 13(b), a transform kernel corresponding to second kernel index "1" may indicate a DST-VII-based transform kernel. Referring to FIG. 13(b), a transform kernel corresponding to third kernel index "2" may indicate a DCT-VIII-based transform kernel.

According to an additional embodiment, the above-described embodiments may be limitedly applied only to a luma block. In this case, a preconfigured default transform kernel may be used for a chroma component. For example, the default transform kernel may be a transform kernel based on DCT-II. The above-described set index may be signaled in units of transform blocks.

Information indicating whether a set index is signaled may be signaled via a header of a high level including a current block. Here, the high level may indicate a slice/tile, a picture, or a sequence, which includes the current block. Information indicating whether the set index is signaled may be signaled via an individual flag for each prediction method. For example, in determination of a transform kernel of a block, a flag indicating whether a set index is used may be independently configured for each of an intra predicted block and an inter predicted block.

According to an embodiment, if information, which indicates whether a set index of a high level including a transform block is signaled, indicates that the set index is not explicitly signaled, a transform kernel may be determined in a different method for the corresponding transform block. For example, a transform kernel to be applied to inverse transformation of the current transform block may be determined based on information derived from information other than the set index. Specifically, the decoder may derive information indicating the transform kernel for the current transform block, from information signaled in relation to the current transform block. That is, information indicating a vertical transform kernel and information indicating a horizontal transform kernel, which are to be used in the transform block may be implicitly signaled. According to another embodiment, if information, which indicates whether a set index of a high level including a transform block is signaled, indicates that the set index is explicitly signaled, the decoder may obtain a transform kernel for the transform block on the basis of the signaled set index.

According to an additional embodiment, whether the encoder signals a set index may be determined according to the number of non-zero transform coefficients in a transform area. In this case, the decoder may determine the transform kernel by comparing the number of non-zero transform coefficients in the transform area with a preconfigured number. For example, if the number of non-zero transform coefficients is two or less, the set index may not be signaled. In this case, an inverse transform unit may perform transformation on the area by using a preconfigured transform kernel. The preconfigured transform kernel may be a DST-VII-based transform kernel.

FIG. 14 is a diagram illustrating a method of obtaining transformation-related information. Transformation of a residual signal of a current block and inverse transformation of a transform coefficient may be performed for each transform block. The current block may be composed of at least one transform block. That is, a transform block may be the current block itself or a block obtained by dividing the current block. If the transform block is the current block itself, the size of the transform block may be the same as the size of the current block. According to an embodiment, the current block may be divided into multiple transform blocks, based on the size of the current block. For example, if the size of the current block is larger than a maximum transform size, the current block may be divided into multiple transform blocks. If the size of the current block is smaller than or equal to the maximum transform size, the transform block may be the current block itself.

According to an embodiment, the maximum transform size may have a value indicating a length of one side. For example, the maximum transform size may have a length of 64. In this case, if the size (width×height) of the current block is 128×32, the current block may be divided into two transform blocks with the size of 64×32. If the maximum transform size is 32 and the size of the current block is 32×32, the transform block is not obtained by dividing the current block and may have the same size as that of the current block.

If both the width and height of the current block have values smaller than or equal to the maximum transform size, the current block is not divided into multiple transform blocks. Accordingly, upper left coordinates of the current block and upper left coordinates of the transform block are the same. On the other hand, if at least one of the width and height of the current block has a value larger than the maximum transform size, the current block may be divided into multiple transform blocks. Accordingly, the upper left coordinates of the current block and the upper left coordinates of the transform blocks may be different.

FIG. 14(a) shows a transform unit syntax. The transform unit syntax indicates processing related to transformation and inverse transformation. The transform unit syntax receives, as factors, (x0, y0) which is upper left coordinates of the transform block, tbWidth and tbHeight indicating sizes in the horizontal and vertical directions of the transform block, and treeType indicating a tree type (S1401).

According to an embodiment, transformation-related information may include coded block flag (cbf) information (tu_cbf_luma, tu_cbf_cb, tu_cdf_cr) indicating whether the transform block includes at least one non-zero transform coefficient. The cbf information may be obtained separately according to a component of a transform unit. For example, the transformation-related information may include at least one of cbf information (tu_cbf_luma[x0][y0]) for a luma component and cbf information (tu_cbf_cb[x0][y0], tu_cbf_cr[x0][y0]) for each of two chroma components.

According to an embodiment, if cbf information of the transform block indicates that the transform block includes at least one non-zero transform coefficient, inverse quantization and inverse transformation may be performed on the transform block. In this case, a decoder may inverse-quantize the quantized transform coefficient by using residual coding-related information. The decoder may inverse-transform the inverse-quantized transform coefficient so as to obtain a residual signal corresponding to the transform block. Conversely, if the cbf information of the transform block indicates that the transform block does not include at least one non-zero coefficient, the decoder may not perform inverse quantization and inverse transformation on the transform block. In this case, the decoder may obtain a residual signal without inverse quantization and inverse transformation. If cbf information of the transform block does not exist, it may be considered, in relation to cbf information, that the transform block does not include at least one non-zero coefficient. An encoder may entropy-code cbf information via the above-described entropy coding unit. The decoder may obtain cbf information from a bitstream via the above-described entropy decoding unit.

Encoding may be performed so that a tree structure for the luma component and tree structure for the chroma components are the same or different. Therefore, the cbf information may be obtained based on information (treeType) indicating the tree type of the transform block (S1402). According to an embodiment, if treeType of the transform block indicates SINGLE_TREE, the tree structure of the transform block for the luma component of the current block and the tree structure of the transform block for the chroma components of the current block may be the same. In this case, cbf information for the luma component and cbf information for each chroma component may be obtained. According to another embodiment, if treeType of the transform block indicates DUAL_TREE_LUMA or DUAL_TREE_CHROMA, the luma component and the chroma components of the current block may be divided into transform blocks having different structures, respectively. If treeType of the transform block indicates DUAL_TREE_LUMA, it means that a currently processed transform block is a luma component block. Accordingly, cbf information on the luma component may be obtained. If treeType information of the transform block indicates DUAL_TREE_CHROMA, it means that the currently processed transform block is a chroma component block. Accordingly, cbf information on the chroma component may be obtained.

In FIG. 14(a), tu_cbf_luma[x0][y0] is an element indicating whether a luma component transform block includes at least one non-zero coefficient, wherein 1 represents that a non-zero coefficient exists in the corresponding transform block in which a position of an upper left luma component sample of the block is (x0, y0) with respect to a position of an upper left luma component sample of a picture. If tu_cbf_luma[x0][y0] does not exist, tu_cbf_luma[x0][y0] may be inferred to be 0. If tu_cbf_luma[x0][y0] is 0, this indicates that all coefficients in the corresponding luma transform block are 0, so the decoder may reconstruct a corresponding residual signal for the luma component without additional parsing, inverse quantization, and inverse transformation. If tu_cbf_luma[x0][y0] is 1, this indicates that one or more non-zero transform coefficients exist in the luma transform block, so that parsing and inverse quantization of the transform coefficients are required in a residual_coding syntax structure, and the residual signal may be reconstructed by applying inverse transformation to the inverse-quantized coefficients. tu_cbf_luma[x0][y0] may be encoded/decoded using a regular coding engine of CABAC in consideration of a context.

tu_cbf_cb[x0][y0] is an element indicating whether a Cb (chroma component) transform block includes one or more non-zero coefficients, wherein 1 represents that a non-zero coefficient exists in the transform block in which an upper left position is (x0, y0). If tu_cbf_cb[x0][y0] does not exist, tu_cbf_cb[x0][y0] may be inferred to be 0. If tu_cbf_cb[x0][y0] is 0, this indicates that all coefficients in the Cb transform block are 0, so that the decoder may reconstruct a residual signal for a Cb signal without additional parsing, inverse quantization, and inverse transformation. If tu_bf_cb[x0][y0] is 1, this indicates that one or more non-zero transform coefficients exist in the Cb transform block, so that parsing and inverse quantization of the transform coefficients are required in the residual coding syntax structure, and the residual signal may be reconstructed by applying inverse transformation to the inverse-quantized coefficients. tu_cbf_cb[x0][y0] may be encoded/decoded using the regular coding engine of CABAC in consideration of a context.

tu_cbf_cr[x0][y0] is an element indicating whether a Cr (chroma component) transform block includes one or more non-zero coefficients, wherein 1 represents that a non-zero coefficient exists in the transform block in which an upper left position is (x0, y0). If tu_cbf_cr[x0][y0] does not exist, tu_cbf_cr[x0][y0] may be inferred to be 0. If tu_cbf_cr[x0][y0] is 0, this indicates that all coefficients in the Cr transform block are 0, so that the decoder may reconstruct a residual signal for a Cr signal without additional parsing, inverse quantization, and inverse transformation. If tu_cbf_cr[x0][y0] is 1, this indicates that one or more non-zero transform coefficients exist in the Cr transform block, so that parsing and inverse quantization of the transform coefficients are required in the residual_coding syntax structure, and the residual signal may be reconstructed by applying inverse transformation to the inverse-quantized coefficients. tu_cbf_cr[x0][y0] may be encoded/decoded using the regular coding engine of CABAC in consideration of a context.

Subsequently, the encoder and the decoder may check a condition for parsing MTS information (cu_mts_flag) indicating whether the MTS method is used in the current transform block (S1403). Hereinafter, conditions for parsing cu_mts_flag will be described. First, whether to parse cu_mts_flag may be determined based on high level MTS information (sps_mts_intra_enabled_flag and sps_mts_inter_enabled_flag) signaled via a high level header of the current transform block. The high level MTS information may be information indicating whether a transform kernel other than the default transform kernel may be used. According to an embodiment, if sps_mts_intra_enabled_flag is 0, this may indicate that cu_mts_flag corresponding to an intra predicted block belonging to a corresponding SPS does not exist. In this case, cu_mts_flag is not parsed. Conversely, if sps_mts_intra_enabled_flag is 1, this may indicate that cu_mts_flag corresponding to the intra predicted block belonging to the SPS exists. In this case, cu_mts_flag may be signaled and parsed.

Similarly, if sps_mts_inter_enabled_flag is 0, this may indicate that cu_mts_flag corresponding to an inter predicted block belonging to a corresponding SPS does not exist. In this case, cu_mts_flag is not parsed. Conversely, if sps_mts_inter_enabled_flag is 1, this may indicate that cu_mts_flag corresponding to the inter predicted block belonging to the SPS exists. In this case, cu_mts_flag may be signaled and parsed. The high level MTS information may be included in a high level syntax and signaled via a header of a sequence, a picture, or a slice/tile.

CuPredMode[x0][y0] is a variable indicating whether the transform block, in which the position of the upper left luma component sample is (x0, y0) with respect to upper left luma component coordinates of the picture, has been predicted in an intra prediction mode or an inter prediction mode. If CuPredMode[x0][y0] is MODE_INTRA, this indicates that a corresponding block is encoded in the intra prediction mode. If CuPredMode[x0][y0] is MODE_INTER, this indicates that the block is encoded in the inter prediction mode. That is, in S1403, (CuPredMode[x0][y0]=MODE_INTRA) && sps_mts_intra_enabled_flag) checks whether MTS is applicable when the current transform block has been encoded by intra prediction. In S1403, (CuPredMode[x0][y0]=MODE_INTER) && sps_mts_inter_enabled_flag) checks whether MTS is applicable when the current transformn block has been encoded by inter prediction.

Whether to parse cu_mts_flag may be determined based on tu_cbf_luma[x0][y0]. This is because, if tu_cbf_luma[x0][y0] indicates that all coefficients of the luma component of the transform block are 0, it is not necessary to perform inverse transformation. According to an additional embodiment, only a DCT-II-based transform kernel may be used in transformation on the chroma component. Whether to parse cu_mts_flag may be determined based on whether a height (tbHeight) and a width (tbWidth) of the transform block have values smaller than or equal to a preconfigured length. The above-described conditions are summarized as follows.

Condition i) sps_mts_intra_enabled_flag=1 and
CuPredMode[x0][y0]=MODE_INTRA, or
sps_mts_inter_enabled_flag=1 and CuPredMode
[x0][y0]=MODE_INTER, Condition ii) tu_cbf_luma[x0][y0]=1, Condition iii) treeType!=DUAL_TREE_CHROMA, and Condition iv) tbWidth<=32, and tbHeight<=32.

When all of the above-described four conditions are satisfied, the decoder may parse cu_mts_flag. The encoder may entropy-code and signal cu_mts_flag. If cu_mts_flag [x0][y0] is 1, this may indicate that the MTS method is applied to the current transform block. Conversely, if cu_mts_flag[x0][y0] is 0, this may indicate that the MTS method is not applied to the current transform block. In this case, inverse transformation may be performed using a default kernel, such as a DCT-II-based transform kernel. If cu_mts_flag[x0][y0] does not exist, cu_mts_flag[x0][y0] may be inferred to be "0".

According to an embodiment of the present disclosure, the transform kernel used for transformation of the transform block may be signaled in stages via a high level header of the current block and a header of the transform block. First, in the sequence, the picture, or the slice/tile, which includes the current block, information indicating whether a transformn kernel other than the default transform kernel may be used may be signaled via the high level header. Further, the information may be individually signaled for each of intra prediction and inter prediction. According to a specific embodiment, sps_mts_intra_enabled_flag and sps_mts_inter_enabled_flag may be signaled via the header of the sequence, picture, or slice/tile. sps_mts_intra_enabled_flag may be information indicating whether a transform kernel other than the default transform kernel may be used in transformation of an intra predicted block. sps_mts_inter_enabled_flag may be information indicating whether a transform kernel other than the default transform kernel may be used in transformation of an inter predicted block.

That is, if sps_mts_intra_enabled_flag indicates that a transform kernel other than the default transform kernel is not allowed to be used, and the current block is an intra predicted block, information related to the transform kernel of the transform block obtained from the current block may not be additionally parsed. In this case, the transform block may be transformed based on the default transform kernel. Further, if sps_mts_inter_enabled_flag indicates that a transform kernel other than the default transform kernel is not allowed to be used, and the current block is an inter predicted block, information related to the transform kernel of the transform block obtained from the current block may not be additionally parsed. In this case, the transform block may be transformed based on the default transform kernel.

On the other hand, if the information signaled via the high level header indicates that a transform kernel other than the default transform kernel may be used, additional information related to the transform kernel of the transform block may be signaled via a transform unit syntax. For example, in transformation of the transform block, information indicating whether a transform kernel other than the default transform kernel is used may be signaled via the transform unit syntax.

According to an embodiment of the present disclosure, the use of a transform kernel other than the default transform kernel for the transform block may be restricted according to the size of the transform block. For example, if the size of the transform block is larger than a preconfigured size, the use of a transform kernel other than the default transform kernel may be restricted in transformation of the transform block. According to an embodiment, if at least one of a height or a width of the transform block has a value larger than a preconfigured length, the use of a transform kernel other than the default transform kernel may not be allowed in transformation of the transform block. For example, the preconfigured length may be 32. Referring to FIG. 14(a), if the transform block has a width of 32 or less and a height of 32 or less, the above-described cu_mts_flag[x0][y0] signaled via the transform unit syntax may be parsed.

As illustrated in FIG. 14(a), if the above-described cbf information indicates that the transform block includes at least one non-zero transform coefficient, residual coding may be performed on the transform block (S1404 to S1406). For example, the decoder may perform residual coding to obtain quantized transform coefficients. In S1404, if tu_cbf_luma[x0][y0]=1, residual coding on the luma component of the transform block may be performed. That is, a residual coding syntax (residual_coding( )) configured to receive a specific input factor may be performed. Specifically, residual_coding( ) may receive, as input factors, coordinates (x0, y0) of an upper left sample of the transform block, a value (log 2(tbWidth)) obtained by taking the base 2 logarithm of the width of the transform block, and a value (log 2(tbHeight)) obtained by taking the base 2 logarithm of the height of the transform block. Also, residual_coding( ) may receive a color index (cdIdx) as an input factor. A cdIdx value "0" indicates the luma component "luma", a cdIdx value "1" indicates the first chroma component "Cb", and a cdIdx value "2" indicates the second chroma component "Cr".

In S1404, if tu_cbf_cb[x0][y0]=1, residual coding on the first chroma component may be performed. Specifically, residual_coding( ) may receive coordinates (x0, y0) of the upper left sample of the transform block, as an input factor. If color format YCbCr is 4:2:0, the size of the chroma component block of the transform block is the size of the luma component block and, if color format YCbCr is 4:4:4, the size of the chroma component block of the transform block may be the same as the size of the luma component block. In this case, as in residual coding on the luma component, residual_coding( ) may receive, as input factors, a value (log 2(tbWidth)) obtained by taking the base 2 logarithm of the width of the transform block, and a value (log 2(tbHeight)) obtained by taking the base 2 logarithm of the height of the transform block.

In S1405, if tu_cbf_cr[x0][y0]=1, residual coding on the second chroma component may be performed. Specifically, residual_coding( ) may receive coordinates (x0, y0) of the upper left sample of the transform block, as an input factor. If color format YCbCr is 4:2:0, the size of the chroma component block of the transform block may be half the size of the luma component block. Accordingly, residual_coding( ) may receive, as input factors, a value (log 2(tbWidth/2) obtained by taking the base 2 logarithm of the width (tbWidth/2) of the chroma component block, and a value (log 2(tbHeight/2)) obtained by taking the base 2 logarithm of the height (tbHeight/2) of the chroma component block. If color format YCbCr is 4:4:4, the size of the chroma component block of the transform block may be the same as the size of the luma component block. In this case, as in residual coding on the luma component, residual_coding( ) may receive, as input factors, a value (log 2(tbWidth)) obtained by taking the base 2 logarithm of the width of the transform block, and a value (log 2(tbHeight)) obtained by taking the base 2 logarithm of the height of the transform block.

The decoder may perform inverse quantization and inverse transform on the transform block, based on the above-described transform-related information. The decoder may obtain a residual signal corresponding to the transform block by performing inverse quantization and inverse transformation. Specifically, the decoder may obtain a quantized transform coefficient of the transform block via the residual coding syntax (residual_coding( )) of FIG. 14(*b*). The decoder may reconstruct the residual signal from the quantized transform coefficient.

Residual_coding( ) in FIG. 14(*b*) receives, as factors, the upper left coordinates of the transform block obtained from the current block with respect to the upper left coordinates of the picture including the current block, a value obtained by taking the base 2 logarithm of the width of the transform block, a value obtained by taking the base 2 logarithm of the height of the transform block, and a color index (cIdx). The residual coding syntax may obtain a quantized transform coefficient, based on transform-related information.

According to an embodiment, the decoder may determine whether to parse a transform skip flag (transform_skip_flag) of the current transform block (S1407). Conditions for parsing transform_skip_flag are as follows.

Condition i) If transform_skip_enabled_flag, which is a 1-bit flag included in a high level syntax, is 1 (on): transform_skip_enabled_flag may be included in one of a sequence parameter set (SPS), a picture parameter set (PPS), and a slice header, transform_skip_enabled_flag of 1 indicates that transform_skip_flag exists in the residual coding syntax, and transform_skip_enabled_flag of 0 indicates that transform_skip_flag does not exist in the residual coding syntax.

Condition ii) In a case of no luma component transform block (cIdx !=0) or a case where MTS is not applied (cu_mts_flag[x0][y0]=0: Transform omission is applicable to both the luma component and the chroma component. If MTS is applied to the luma component transform block (cIdx=0 && cu_mts_flag[x0][y0]=1), it is obvious that transformation is performed, so that there is no need to encode/decode transform_skip_flag[x0][y0][cIdx].

Condition iii) If the width of the transform block is less than 4 (log 2TbWidth<=2) and the height of the transform block is less than 4 (log 2TbHeight<=2), whether to parse transform_skip_flag[x0][y0][cIdx] may be determined according to the above-described conditions. If transform_skip_flag[x0][y0][cIdx] is 1, the decoder may not perform transformation. If transform_skip_flag[x0][y0][cIdx] is 0, the decoder may determine whether to transform the current transform block, by referring to other syntax elements. The decoder may obtain a quantized transform coefficient via a residual_coding( ) part omitted in FIG. 14(*b*). The decoder may inverse-quantize the obtained transform coefficient and transform the same. As a result, the decoder may obtain the residual signal.

Subsequently, the decoder may determine whether to parse a set index (mts_idx) (S1408). Conditions for parsing mts_idx are as follows.

i) a case of the luma component transform block (cIdx=0) and cu_mts_flag[x0][y0]=1 ii) transform_skip_flag[x0][y0]=0: If transform_skip_flag [x0][y0] is 1, this indicates that a transform skip is applied, so there is no need to determine a transform kernel to be used.

iii) The current transform block is at least a part of the intra predicted block, (CuPredMode[x0][y0]=MODE_INTRA), and there are three or more non-zero coefficients in the block (numSigCoeff>2), or the current transform block is at least a part of the inter predicted block (CuPredMode [x0][y0]=MODE_INTER) (where, a variable, numSigCoeff, represents the number of non-zero coefficients existing in the transform block).

Regarding condition iii), if the number of non-zero coefficients existing in the transform block is 2 or less (1 or 2), the current transform block may be transformed using a preconfigured transform kernel without signaling/parsing mts_idx[x0][y0]. The preconfigured transform kernel may be a DST-VII-based transform kernel, and a DST-IV-based transform kernel may be used instead of the DST-VII-based transform kernel.

FIG. 15 is a diagram illustrating a residual coding syntax according to another embodiment of the present disclosure. Among syntax elements of FIG. 15, syntax elements overlapping with those of FIG. 14(*a*) may conform to the descriptions related to FIG. 14(*a*). In FIG. 14(*b*), the set index (mts_idx) may be parsed only if specific conditions are satisfied. For example, mts_idx may be parsed only when a first condition and a second condition are satisfied. The first condition may be a case in which cu_mts_flag of the current transform block indicates that a transform kernel other than the default transform kernel is allowed to be used. The second condition may be a case in which the above-described transform_skip_flag does not indicate a transform skip. However, the second condition may be omitted due to the first condition. Specifically, referring to S1501 of FIG. 15, if the first condition (cu_mts_flag=1) is true, transform_skip_flag is not parsed. If transform_skip_tag is not parsed, determination may be made to be "0". In this case, a decoder may determine that transform skip information does not indicate a transform skip. Accordingly, the second condition for parsing mts_idx may be omitted. That is, referring to S1502 of FIG. 15, a condition of "!transform_skip_flag[x0][y0][cIdx]" among the conditions for parsing mts_idx in S1408 of FIG. 14 may be omitted.

According to FIG. 14(*a*), only when both the height and width of the transform block are within a preconfigured range, a transform kernel other than the default transform kernel may be allowed to be used in transformation of the transform block. However, if the height and width of the transform block are different from each other, one of the width and height may have a value within the preconfigured range, and the other may have a value outside the preconfigured range. In this case, it may be advantageous to use a transform kernel other than the default transform kernel, in transformation corresponding to a side having a length within the preconfigured range. That is, if one of the width and height of the transform block is within the preconfigured range, it may be advantageous to use a transform kernel other than the default transform kernel for one of vertical transformation and horizontal transformation. Therefore, even if one of the height and width of the transform block is within the preconfigured range, a transform kernel other than the default transform kernel may be used for transformation of the transform block.

Figure 16:
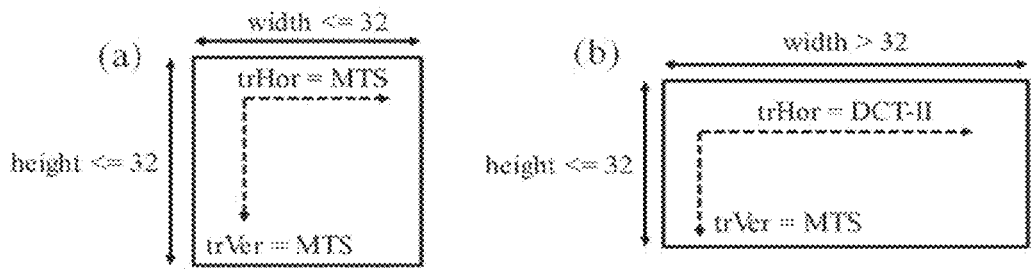
FIG. 16 a diagram illustrating a transform unit syntax according to an embodiment of the present disclosure.

FIG. 16 a diagram illustrating a transform unit syntax according to an embodiment of the present disclosure. Among syntax elements of FIG. 16, syntax elements overlapping with those of FIG. 14(*a*) may conform to the descriptions related to FIG. 14(*a*). According to an embodiment, if at least one of the width or height of a transform block has a value within a preconfigured range, at least one of a horizontal transform kernel and a vertical transform kernel may be a transform kernel other than a default transform kernel. Therefore, if at least one of the width or height of the transform block has a value within the preconfigured range, the above-described MTS information may be parsed. According to an embodiment, the preconfigured range may represent a preconfigured length. For example, if at least one of the width and height of the transform block has a value smaller than or equal to the preconfigured length, a transform kernel other than the default transform kernel may be used for transformation of the transform block.

Referring to block 1601 of FIG. 16, if at least one of the width (tbWidth) and height (tbHeight) of the transform block has a value smaller than or equal to the preconfigured length, cu_mts_flag may be parsed. That is, if tbWidth of the transform block has a value smaller than or equal to the preconfigured length or tbHeight has a value smaller than or equal to the preconfigured length, a transform kernel other than the default transform kernel may be used. In this case, the preconfigured length may be 32. However, the present disclosure is not limited thereto. For example, the preconfigured length may be 16 or 64. If the preconfigured length is 16, a transform kernel other than the default transform kernel may be used for a transform block having a width of 16 or less or a height of 16 or less. If the preconfigured length is 64, a transform kernel other than the default transform kernel may be used for a transform block having a width of 64 or less or a height of 64 or less. Among the conditions of S1403 of FIG. 14(*a*), "tbWidth<=32 and tbHeight<=32" may be replaced with "tbWidth<=32 or tbHeight<=32".

According to an additional embodiment, the preconfigured length may be differently configured depending on a prediction mode. For example, if the current transform block is an intra predicted block, the preconfigured length may be determined according to information (log 2 mts_max_size_intra_minus2) indicating a maximum size of an available transform kernel for an intra prediction block. Specifically, a value, which is obtained by subtracting 2 from a value obtained by taking the base 2 logarithm of the maximum size of the available transform kernel, may be signaled. Similarly, if the current transform block is an inter predicted block, the preconfigured length may be determined according to information (log 2_mts_max_size_inter_minus2) indicating a maximum size of a transform kernel, which is available for an inter prediction block. In this case, block 1601 of FIG. 16 may be replaced with the following conditions.

&&((CuPredMode[*x*0][*y*0]=MODE_INTRA)&&((log
2(tbWidth)<=log 2_mts_max_size_intra-
_minus2+2)||(log 2(tbHeight)<=log 2_mts_max-
_size_intra_minus2+2)))||((CuPredMode[*x*0][*y*0]
==MODE_INTER)&& ((log 2(tbWidth)<=Log
2_mts_max_size_inter_minus2+2)||(log 2(tbHie-
ight)<=log 2_mts_max_size_inter_minus2+2)))

In transformation on the transform block, the transform kernel used for each of vertical transformation and horizontal transformation may be determined independently of each other. As described above, if one of the height and width of the current transform block is within the preconfigured range, a transform kernel other than the default transform kernel may be used for one of horizontal transformation and vertical transformation. Accordingly, the vertical transform kernel and the horizontal transform kernel of the transform block may be obtained based on lengths of different sides of the transform block, respectively. According to an embodiment of the present disclosure, an encoder and a decoder may obtain a vertical transform kernel and a horizontal transform kernel of a transform block, based on lengths of different sides of the transform block, respectively.

First, a decoder may obtain at least one transform block for a residual signal of a current block. The transform block may include multiple transform coefficients arranged in two dimensions. The multiple transform coefficients may include at least one of a non-zero transform coefficient and a zero transform coefficient. The transform block may be a block including multiple sides. For example, the transform block may be a block including a first side and a second side orthogonal to the first side. For example, the shape of the transform block may be square or rectangular. Alternatively, the shape of the transform block may be a triangle. In this case, a first side and a second side that are orthogonal to each other may correspond to the base side and the height of the triangle, respectively. Alternatively, the first side and the second side may be two sides, each of which forms the triangle.

According to an embodiment, a horizontal transform kernel for horizontal transformation of the transform block may be determined based on length information of the first side of the transform block. For example, based on the length information of the first side of the transform block, the encoder and the decoder may determine a horizontal transform kernel regardless of the length of the second side of the transform block. The second side may be a side orthogonal to the first side. A vertical transform kernel for vertical transformation of the transform block may be determined based on length information of the second side of the transform block. Based on the length information of the second side of the transform block, the encoder and the decoder may determine a vertical transform kernel regardless of the length of the first side of the transform block. That is, the horizontal transform kernel and the vertical transform kernel of the transform block may be individually determined. Conditions used to determine the horizontal transform kernel and the vertical transform kernel of the transform block may be independent of each other.

According to an embodiment, the length of the first side may correspond to the width of the transform block, and the length of the second side may correspond to the height of the transform block. That is, the horizontal transform kernel may be determined based on the width of the transform block. The vertical transform kernel may be determined based on the height of the transform block. The horizontal transform kernel and the vertical transformn kernel of the transform block may be determined independently of each other according to the length of the first side corresponding to the horizontal direction of the transform block and the length of the second side corresponding to the vertical direction of the transform block, respectively.

Specifically, the encoder and the decoder may determine the horizontal transform kernel of the transform block, based on whether the length of the first side of the transform block is within a first preconfigured range. The encoder and the decoder may determine the vertical transform kernel of the transform block, based on whether the length of the second side is within a second preconfigured range. The first preconfigured range and the second preconfigured range may be the same range. Hereinafter, a case in which the first preconfigured range and the second preconfigured range are a single preconfigured range will be described as an example. However, the present disclosure is not limited thereto, and each of the first preconfigured range and the second preconfigured range may be individually configured via a method described below. Depending on the shape of the transform block, different preconfigured ranges may be used.

According to an embodiment of the present disclosure, each of the horizontal transform kernel and the vertical transform kernel may be a transform kernel selected from multiple available transform kernels. According to an embodiment, the shape of the transform block may be rectangular. That is, the length of the first side and the length of the second side of the transform block may be different from each other. One of the length of the first side and the length of the second side of the transform block may have a value outside the preconfigured range, and the other may have a value within the preconfigured range. In this case, the horizontal transform kernel and the vertical transform kernel may be different transform kernels.

According to a specific embodiment, multiple available transform kernels may include a first transform kernel and a second transform kernel. Each of the multiple available transform kernels may be indicated by a different kernel index. If one of the length of the first side and the length of the second side of the transform block has a value outside the preconfigured range, and the other has a value within the preconfigured range, one of the horizontal transform kernel and the vertical transform kernel may be the first transform kernel, and the other may be the second transform kernel. For example, the length of the first side may have a value outside the preconfigured range, and the length of the second side may have a value within the preconfigured range. In this case, the horizontal transform kernel may be the first transform kernel, and the vertical transform kernel may be the second transform kernel. Conversely, the length of the second side may have a value outside the preconfigured range, and the length of the first side may have a value within the preconfigured range. In this case, the vertical transform kernel may be the first transform kernel, and the horizontal transform kernel may be the second transform kernel. That is, among the horizontal transform kernel and the vertical transform kernel, a transform kernel corresponding to a side having a length outside the preconfigured range may be the first transform kernel. That is, among the horizontal transform kernel and the vertical transform kernel, a transform kernel corresponding to a side having a length within the preconfigured range may be the second transform kernel.

The first transform kernel may be a default transform kernel, and the second transform kernel may be one of available transform kernels other than the default transform kernel. The first transform kernel may be an available transform kernel indicated by a kernel index having a smallest value from among kernel indices indicating respective multiple available transform kernels. The first transform kernel may be the default transform kernel. According to an embodiment, the first transform kernel may be a DCT-II-based transform kernel, and the second transform kernel may not be a DCT-II-based transform kernel. That is, the second transform kernel may be a non-DCT-II-based transform kernel. In this case, the non-DCT-II-based transform kernel may be one of a DST-VII-based transform kernel and a DCT-VIII-based transform kernel. For example, the second transform kernel may be a DST-VII-based transform kernel.

According to an additional embodiment, the above-described embodiment may be applied to an intra prediction block. For example, the encoder and the decoder may determine whether to use the above-described method according to whether a prediction mode corresponding to the transform block is an intra prediction mode. Specifically, if the prediction mode corresponding to the transform block is an intra prediction mode, the encoder and the decoder may determine the horizontal transform kernel and the vertical transform kernel of the transform block, based on the length information of the first side and the length information of the second side, respectively. Conversely, if the prediction mode corresponding to the transform block is an inter prediction mode, the encoder and the decoder may determine each of the horizontal transform kernel and the vertical transform kernel of the transform block by using a different method.

According to an embodiment, the preconfigured range may indicate a preconfigured first length value or smaller. For example, the length of one of the first and second sides may have a value larger than the first length value, and the length of the other one may have a value smaller than or equal to the first length value. In this case, the horizontal transform kernel and the vertical transform kernel may be different from each other. The preconfigured range may indicate a preconfigured second length value or larger. For example, if an intra sub-partition (ISP) mode is used, the preconfigured range may indicate a value equal to or smaller than the first length value and a value equal to or larger than the second length value. The second length value may be a value smaller than the first length value. Conversely, if the ISP mode is not used, the preconfigured range may indicate a value equal to or smaller than the preconfigured first length value.

According to an embodiment, the preconfigured range may be a range configured according to a maximum size of an available transform kernel. For example, the above-described first length value may be determined according to a maximum size of each of available transform kernels. The first length value may be determined based on a maximum size of a specific transform kernel excluding the default transform kernel from among multiple available transform kernels. According to an embodiment, a maximum size of the default transform kernel may be 32, and the maximum size of the specific transform kernel may have a value smaller than 32. In this case, the first length value may be configured to a value smaller than 32. Specifically, if the maximum size of the specific transform kernel is 16, the first length value may be 16. On the other hand, if a maximum size of a specific available transform kernel is 32, the first length value may be 32.

In this case, the maximum size of the available transform kernel may be signaled via a high level header including a current block. For example, signaling may be performed via a header of a sequence, picture, or slice/tile. Specifically, a value, which is obtained by subtracting 2 from a value obtained by taking the base 2 logarithm of the maximum size of the available transform kernel, may be signaled. The maximum size of the available transform kernel may vary depending on a prediction mode. In this case, each of information indicating a maximum size of a transform kernel available for an intra predicted block and information indicating a maximum size of a transform kernel available for an inter predicted block may be signaled individually.

The above-described second length value may be a value configured according to a minimum size of the available transform kernel. As described above, each of the horizontal transform kernel and the vertical transform kernel may be a transform kernel selected from multiple available transform kernels. Minimum sizes of the respective multiple available transform kernels may be different. According to a specific embodiment, the multiple available transform kernels may include a first transform kernel and a second transform kernel. A minimum size of the first transform kernel may be 2×2, and a minimum size of the second transform kernel may be 4×4. In this case, the second length value may be 4.

Figure 17:
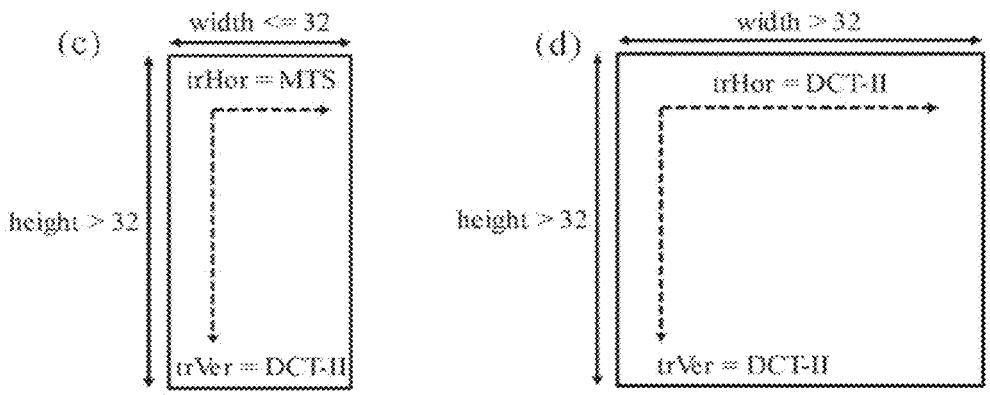
FIG. 17 is a diagram illustrating a vertical transform kernel and a horizontal transform kernel according to a shape of a transform block.

FIG. 17 is a diagram illustrating a vertical transform kernel and a horizontal transform kernel according to a shape of a transform block. FIG. 17 illustrates an example in which a preconfigured first length is 32, but the present disclosure is not limited thereto. For example, the preconfigured first length may be 16. FIG. 17(a) illustrates a horizontal transform kernel (trHor) and a vertical transform kernel (trVer) of a transform block in which both a width and a height are within a preconfigured range. That is, the width and height of the transform block may have a value 32 or smaller. In this case, an available transform kernel other than the default transform kernel may be used for both the horizontal transform kernel and the vertical transform kernel.

According to an embodiment, there may be multiple available transform kernels other than the default transform kernel. In this case, an indicator indicating one of the multiple available transform kernels may be signaled. For example, an encoder may signal an indicator indicating the vertical transform kernel or the horizontal transform kernel which are to be used for a transform block from among the multiple available transform kernels. A decoder may determine the vertical transform kernel and horizontal transform kernel used for the transform block, based on the signaled indicator.

As shown in FIG. 17(a), if both the width and height of the transform block have a value equal to or smaller than a first length, individual indicators may be signaled for the horizontal transform block and the vertical transform block, respectively. Alternatively, information indicating a combination of the horizontal transform kernel and vertical transform kernel used for transformation of the transform block may be signaled. For example, an available transform kernel other than the default transform kernel may include a third transform kernel based on DST-VII and a fourth transform kernel based on DCT-VIII In this case, first information indicating that both the horizontal transform kernel and the vertical transform kernel are a third transform kernel may be signaled. Second information indicating that the horizontal transform kernel is the third transform kernel and the vertical transform kernel is the fourth transform kernel may be signaled. Third information indicating that the horizontal transform kernel is the fourth transform kernel and the vertical transform kernel is the third transform kernel may be signaled. Fourth information indicating that both the horizontal transform kernel and the vertical transform kernel are the fourth transform kernel may be signaled. The first to fourth information may be indicated via different index values, respectively.

FIG. 17(b) and FIG. 17(c) illustrate a horizontal transform kernel (trHor) and a vertical transform kernel (trVer) of a transform block in a case where one of a width or a height of the transform block has a value outside a preconfigured range, and the other has a value within the preconfigured range. In this case, the horizontal transform kernel and the vertical transform kernel may be different from each other. If the width of the current transform block is outside the preconfigured range and the height is within the preconfigured range, the encoder and the decoder may use the first transform kernel as the horizontal transform kernel. In this ease, the encoder and the decoder may use the second transform kernel as the vertical transform kernel.

Conversely, if the width of the current transform block is within the preconfigured range and the height is outside the preconfigured range, the encoder and the decoder may use the second transform kernel as the horizontal transform kernel. In this case, the encoder and the decoder may use the first transform kernel as the vertical transform kernel.

According to an embodiment, a preconfigured rule may be to use one available transform kernel, which is indicated for a corresponding transform block, from among multiple available transform kernels. The multiple available transform kernels may include a first transform kernel and a second transform kernel. As described above, the first transform kernel is a DCT-II-based transform kernel, and the second transform kernel may be one of non-DCT-II-based transform kernels.

According to another embodiment, the preconfigured rule may be to use one available transform kernel, which is indicated for the transform block, from among multiple available transform kernels excluding the first transform kernel. That is, the encoder and the decoder may perform transformation using one available transform kernel, which is indicated for the current transform block, from among the multiple available transform kernels excluding the first transform kernel. The multiple available transform kernels excluding the first transform kernel may include a DST-VII-based transform kernel and a DCT-VII-based transform kernel. The preconfigured rule may be to use a preconfigured transform kernel, in transformation corresponding to a side having a length within the preconfigured range. The preconfigured transform kernel may be a DST-VII-based transform kernel.

For example, the encoder and the decoder may determine the horizontal transform kernel, based on whether the width of the transform block has a value smaller than or equal to the first length. As shown in FIG. 17(b), if the width of the transform block has a value larger than the first length, the horizontal transform kernel may be the first transform kernel. As shown in FIG. 17(c), if the width of the transform block has a value smaller than or equal to the first length, the horizontal transform kernel may be the second transform kernel. The horizontal transform kernel may be a DST-VII-based transform kernel.

The encoder and decoder may determine the vertical transform kernel, based on whether the height of the transform block has a value smaller than or equal to the first length. As shown in FIG. 17(b), if the height of the transform block has a value smaller than or equal to the first length, the vertical transform kernel may be the second transform kernel. The vertical transform kernel may be a DST-VII-based transform kernel. As shown in FIG. 17(c), if the height of the transform block has a value larger than the first length, the vertical transform kernel may be the first transform kernel. According to an additional embodiment, if the current block is divided into a preconfigured number of transform blocks or more, the default transform kernel may be used for both vertical transformation and horizontal transformation of the transform block. The default transform kernel may be a DCT-II-based transform kernel.

FIG. 17(d) illustrates a horizontal transform kernel (trHor) and a vertical transform kernel (trVer) of a transform block in which both a width and a height of the transform block are outside a preconfigured range. That is, the width and height of the transform block may have a value larger than a first length. In this case, the encoder and the decoder may perform vertical transformation and horizontal transformation by using a default transform kernel. For example, the default transform kernel may be a transform kernel based on DCT-II.

Information indicating a combination of the horizontal transform kernel and the vertical transform kernel used for transformation of the transform block may not be explicitly signaled. In this case, the horizontal transform kernel and the vertical transform kernel for the transform block may be determined based on at least one of the size or shape of the transform block. For example, energy distribution of a residual signal may be correlated with the shape of the block. If the current block is not a square block but a rectangular block, the energy distribution may be different. Accordingly, the transform kernel may be adaptively applied in consideration of the shape of the block. Through this, the residual signal may be efficiently compressed. The horizontal transform kernel and the vertical transform kernel for the transform block may be determined based on a method by which a coding block including the transform block is predicted.

FIG. 18 is a diagram illustrating a method of determining a transform kernel on the basis of a shape of a transform block. Referring to FIG. 18, if a coding block including a transform block is an inter predicted block, both a horizontal transform kernel and a vertical transform kernel of the transform block may be DCT-II-based transform kernels. On the other hand, if a coding block including a transform block is an intra predicted block, an encoder and a decoder may obtain a horizontal transform kernel and a vertical transform kernel, which are used for transformation of the transform block, according to a shape of the transform block. According to an embodiment, if the shape of the transform block is a square, a default transformn kernel may be used for horizontal transformation and vertical transformation. The default transform kernel may be the above-described first transform kernel. The default transform kernel may be a DCT-II-based transform kernel.

According to another embodiment, if the transform block has a rectangular shape, a vertical transform kernel and a horizontal transform kernel may be different from each other. The default transform kernel may be used for transformation corresponding to long sides of the transform block. A non-DCT-II-based transform kernel may be used for transformation corresponding to short sides of the transform block. For example, if the width of the transform block has a value smaller than that of the height, a DCT-II-based transform kernel may be used as the vertical transform kernel, and a non-DCT-II-based transform kernel may be used as the horizontal transform kernel. Conversely, if the width of the transform block has a value larger than that of the height, a DCT-II-based transform kernel may be used as the horizontal transform kernel, and a non-DCT-II-based transform kernel may be used as the vertical transform kernel. The non-DCT-II-based transform kernel may be a DST-VII-based transform kernel. The non-DCT-II-based transform kernel may be a transform kernel indicated by an indicator indicating one of multiple non-DCT-II-based transform kernels.

If a length of the short side of the transform block has a value larger than that of a maximum size of a DST-VII-based transform kernel, the DCT-II-based transform kernel may be used for transformation (for example, vertical transformation when the short side is the height, and horizontal transformation when the short side is the width) corresponding to the short side. For a specific example, the maximum size of the DST-VII-based transform kennel may be 32×32. In this case, a horizontal transform kernel of a first transform block having a size of 64×32 may be a DCT-II-based transform kernel, and a vertical transform kernel may be a DST-VII-based transform kernel. On the other hand, both a horizontal transform kernel and a vertical transform kernel of a second transform block having a size of 28×64 may be DCT-II-based transform kernels.

According to an additional embodiment, using a DCT-II-based transform kernel rather than a DST-VII-based transform kernel may incur a lower rate-distortion cost even for transformation corresponding to a short side of the transform block. Therefore, via additional signaling, it may be configured to use a DCT-II based transform kernel for transformation corresponding to the short side. Additional signaling may be performed via 1-bit or flag.

According to another embodiment, a DST-IV based transform kernel may be used for transformation (for example, vertical transformation when the short side is the height, and horizontal transformation when the short side is the width) corresponding to the short side of the transform block. As described above with reference to FIG. 11, a DST-VII-based transform kernel has a high implementation complexity, and the DST-VII-based transform kernel may thus be replaced with a DST-IV-based transform kernel having a similar pattern of a low-frequency basis function. According to an additional embodiment, the replaced transform kernel may be used only for a transform block corresponding to a preconfigured size. For example, if the size of the transform kernel used for the transform block is 4×4 or 8×8, the DST-VII-based transform kernel may be replaced with a DST-IV-based transform kernel.

According to another embodiment, for transformation (for example, vertical transformation when the short side is the height, and horizontal transformation when the short side is the width) corresponding to the short side of the transform block, a transform kernel determined according to an intra prediction mode of the coding block including the transform block may be used. For example, if the intra prediction mode of the coding block is a DC mode or a planar mode, a transform kernel used for transformation corresponding to the short side of the transform block may be a DCT-II-based transform kernel.

As another example, the transform block may be a horizontal rectangle, the width of which has a value larger than that of the height. If the intra prediction mode of the coding block including the transform block is a horizontal direction mode, a DCT-II-based transform kernel may be used for transformation (i.e., vertical transformation) corresponding to the short side (i.e., height) of the transform block that is a horizontal rectangle. Here, the horizontal direction mode may represent an intra prediction mode having a value which is equal to or larger than a horizontal diagonal mode and is smaller than or equal to a diagonal mode. On the other hand, if the intra prediction mode of the coding block including the transform block is a vertical direction mode, a DST-VII-based transform kernel may be used for transformation (i.e., vertical transformation) corresponding to the short side (i.e., height) of the transform block that is a horizontal rectangle. Here, the vertical direction mode may represent an intra prediction mode having a value which is larger than the diagonal mode and is equal to or smaller than a vertical diagonal mode.

Conversely, the transform block may be a vertical rectangle, the height of which has a value larger than that of the width. If the intra prediction mode of the coding block including the transform block is a horizontal direction mode, a DST-VII-based transform kernel may be used for transformation (i.e., horizontal transformation) corresponding to the short side (i.e., width) of the transform block that is a vertical rectangle. On the other hand, if the intra prediction mode of the coding block including the transform block is a vertical direction mode, a DCT-II-based transform kernel may be used for transformation (i.e., horizontal transformation) corresponding to the short side (i.e., width) of the transform block that is a vertical rectangle.

Hereinafter, a method of explicitly signaling a transform kernel of a transform block will be described. For example, information indicating a combination of a horizontal transform kernel and a vertical transform kernel of the transform block may be signaled. The information indicating the combination of the horizontal transform kernel and the vertical transform kernel may be signaled via a set index. The information indicated by a specific set index may vary according to at least one of the size or shape of the transform block.

FIG. 19 is a diagram illustrating a method of signaling information indicating a combination of a horizontal transform kernel and a vertical transform kernel. In FIG. 19, set index mts_idx[xTbY][yTbY] may indicate a transform kernel applied to a transform block having upper left luma component coordinates of (xTbY, yTbY) with respect to upper left luma component coordinates of a picture. A most significant bit (MSB) of mts_idx may indicate a kernel index of a transform kernel used for vertical transformation. A least significant bit (LSB) of mts_idx may indicate a kernel index of a transform kernel used for horizontal transformation. According to an embodiment, mts_idx may be signaled via 2 bits of a fixed length. According to another embodiment, mts_idx may be signaled via a bitstream of a variable length, such as truncated binary.

According to an embodiment, a transform kernel corresponding to kernel index "0" may represent a DCT-II-based transform kernel. A transform kernel corresponding to kernel index "1" may be a DST-VII-based transform kernel, and a transform kernel corresponding to kernel index "2" may be a DCT-VIII-based transform kernel.

FIG. 19(a) is a diagram showing information indicated by a set index (mts_idx) if both a width and a height of a transform block have a value equal to or smaller than 32. In this case, a horizontal transform kernel and a vertical transform kernel according to mts_idx may be interpreted as follows.
  i) if mts_idx is −1: horizontal-DCT-II and vertical-DCT-II
  ii) if mts_idx is 0: horizontal-DST-VII and vertical-DST-VII
  iii) if mts_idx is 1: horizontal-DCT-VIII and vertical-DST-VII
  iv) if mts_idx is 2: horizontal-DST-VII and vertical-DCT-VIII
  v) if mts_idx is 3: horizontal-DCT-VIII and vertical-DCT-VIII FIG. 19(b) is a diagram showing information indicated by the set index if the width of the transform block has a value equal to or larger than 32, and height has a value smaller than 32. In this case, the horizontal transform kernel and the vertical transform kernel according to mts_idx may be interpreted as follows.
  i) if mts_idx is −1: horizontal-DCT-II and vertical-DCT-II
  ii) if mts_idx is 0: horizontal-DCT-II and vertical-DST-VII
  iii) if mts_idx is 1: horizontal-DCT-II and vertical-DCT-VIII FIG. 19(c) is a diagram showing information indicated by the set index if the width of the transform block has a value equal to or smaller than 32, and the height has a value larger than 32. In this case, the horizontal transform kernel and the vertical transform kernel according to mts_idx may be interpreted as follows.
  i) if mts_idx is −1: horizontal-DCT-II and vertical-DCT-II
  ii) if mts_idx is 0: horizontal-DST-VII and vertical-DCT-II
  iii) if mts_idx is 1: horizontal-DCT-VIII and vertical-DCT-II FIG. 19D is a diagram showing information indicated by the set index if both the width and height of the transform block have a value larger than 32. In this case, both the horizontal transform kernel and the vertical transform kernel according to mts_idx may be DCT-II-based transformation kernels.

As described above with reference to FIG. 11, a DST-VII-based transform kernel may be replaced with a DST-IV-based transform kernel. A DCT-VIII-based transform kernel may be replaced with a DCT-IV-based transform kernel. According to an additional embodiment, the replaced transform kernel may be used only for a transform block corresponding to a preconfigured size. For example, if the size of the transform kernel used for the transform block is 4×4 or 8×8, a corresponding DST-VII- or DCT-VIII-based transform kernel may be replaced with a DST-IV- or DCT-IV-based transform kernel. Through this, it is possible to prevent a decrease in coding efficiency.

Figures 20, 21:
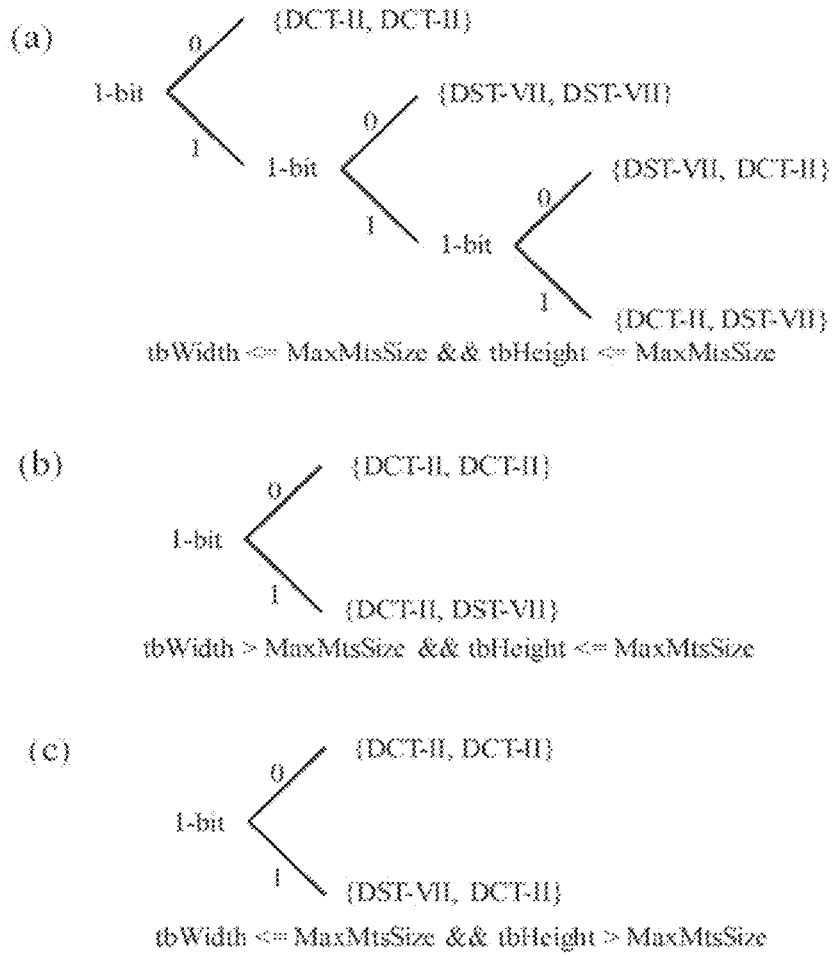
FIG. 20 is a diagram illustrating a method of signaling a transform kernel set according to an embodiment of the present disclosure.
FIG. 21 is a diagram illustrating a plurality of transform kernel sets according to an embodiment of the present disclosure.

FIG. 20 is a diagram illustrating a method of signaling a transform kernel set according to an embodiment of the present disclosure. According to an embodiment, a transform kernel set may be signaled based on a maximum size of a preconfigured transform kernel. The preconfigured transform kernel may be a transform kernel other than a default transform kernel. The preconfigured transform kernel may be a non-DCT-II-based transform kernel. For example, maximum sizes of a DST-VII-based transform kernel and a DCT-VIII-based transform kernel may be the same. On the other hand, a maximum size of a DCT-II-based transform kernel may be different from a maximum size of a non-DCT-II based transform kernel. Hereinafter, the maximum size of the preconfigured transform kernel may be referred to as MaxMtsSize. MaxMtsSize may be signaled via a header of a sequence, picture, or slice/tile. MaxMtsSize may be configured to have a different value depending on whether a prediction mode is intra prediction or inter prediction.

According to an embodiment, if at least one of a width and a height of a transform block has a value equal to or smaller than that of MaxMtsSize, a transform kernel other than a default transform kernel may be used in transformation of the transform block. FIG. 20(a) illustrates a method of signaling a transform kernel set if a width of a transform block has a value equal to or smaller than that of MaxMtsSize, and a height has a value equal to or smaller than that of MaxMtsSize. First, a first bit indicating availability of a transform kernel other than the default transform kernel may be signaled. For example, if the first bit indicates that a transform kernel other than the default transform kernel cannot be used, both a vertical transform kernel and a horizontal transform kernel of the transform block may be DCT-II-based transform kernels. If the first bit indicates that a transform kernel other than the default transform kernel can be used, additional information may be signaled.

According to an embodiment, the additional information may be configured by two bits. If the first bit of the additional information indicates 0, both the vertical transform kernel and the horizontal transform kernel of the transform block may be DST-VII-based transform kernels. If the first bit of the additional information indicates 1, the transform kernel set may be determined by a subsequent bit. For example, if a second bit of the additional information indicates 0, the horizontal transform kernel may be a DST-VII-based transform kernel, and the vertical transform kernel may be a DCT-II-based transform kernel. If the second bit of the additional information indicates 1, the horizontal transform kernel may be a DCT-II-based transform kernel, and the vertical transform kernel may be a DST-VII-based transform kernel.

FIG. 20(b) illustrates a method of signaling a transform kernel set if the width of the transform block has a value larger than that of MaxMtsSize, and the height has a value equal to or smaller than that of MaxMtsSize. First, a first bit indicating availability of a transform kernel other than the default transform kernel may be signaled. As described above, if the first bit indicates that a transform kernel other than the default transform kernel cannot be used, both the vertical transform kernel and the horizontal transform kernel of the transform block may be DCT-II-based transform kernels. If the first bit indicates that a transform kernel other than the default transform kernel can be used, the vertical transform kernel of the transform block may be a DST-VII-based transform kernel, and the horizontal transform kernel may be a DCT-II-based transform kernel.

FIG. 20(c) illustrates a method of signaling a transform kernel set if the width of the transform block has a value equal to or smaller than that of MaxMtsSize, and the height has a value larger than that of MaxMtsSize. First, a first bit indicating availability of a transform kernel other than the default transform kernel may be signaled. If the first bit indicates that a transform kernel other than the default transform kernel cannot be used, both the vertical transform kernel and the horizontal transform kernel of the transform block may be DCT-II-based transform kernels. If the first bit indicates that a transform kernel other than the default transform kernel can be used, the vertical transform kernel of the transform block may be a DST-VII-based transform kernel, and the horizontal transform kernel may be a DCT-II-based transform kernel. If the width of the transform block has a value larger than that of MaxMtsSize, and the height has a value larger than that of MaxMtsSize, both the vertical transform kernel and the horizontal transform kernel of the transform block may be determined to be DCT-II-based-transform kernels, without separate signaling.

FIG. 21 is a diagram illustrating a plurality of transform kernel sets according to an embodiment of the present disclosure. According to an embodiment, if a first bit indicating availability of a transform kernel other than a default transform kernel indicates that a transform kernel other than the default transform kernel can be used, and a set index (mts_idx) for a transform block is not signaled, it may be considered that the set index (mts_idx) indicates "−1". In this case, both a horizontal transform kernel and a vertical transform kernel of the transform block may be DCT-II-based transform kernels. In the embodiment of FIG. 21, it is described that transform kernel sets indicated by the same kernel index are configured differently depending on whether a current block is an intra predicted block or an inter predicted block. However, the present disclosure is not limited thereto, and the same set index (mts_idx) may be configured to indicate the same transform kernel set regardless of whether a prediction mode of the current block is intra prediction or inter prediction.

Figures 22, 23:
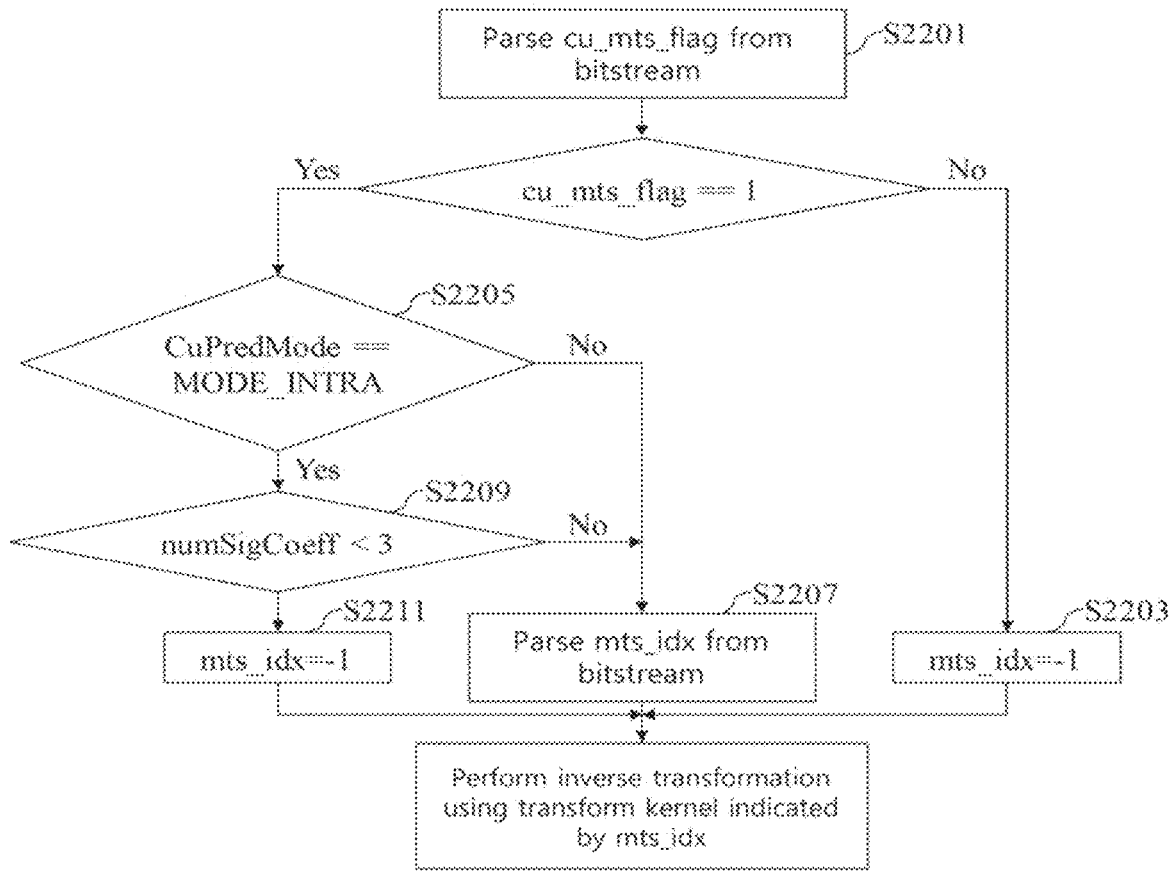
FIG. 22 is a diagram illustrating a method of determining, by a decoder, a transform kernel applied to a transform block according to an embodiment of the present disclosure.
FIG. 23 is a diagram illustrating a plurality of transform kernel sets according to another embodiment of the present disclosure.

FIG. 22 is a diagram illustrating a method of determining, by a decoder, a transform kernel applied to a transform block according to an embodiment of the present disclosure. First, a decoder may parse a first bit (cu_mts_flag) indicating availability of a transform kernel other than a default transform kernel, based on a received bitstream (S2201). Subsequently, if cu_mts_flag is 0, the decoder may consider that set index mts_idx indicates "−1" (S2203). In this case, the decoder may perform inverse transformation on the transform block by using a DCT-II-based transform kernel.

If cu_mts_flag is 1, the decoder may determine whether a coding block including the transform block is an intra predicted block (S2205). If the coding block is an inter predicted block that is not an intra predicted block, the decoder may parse, from the bitstream, the set index (mts_idx) of the transform block obtained from the coding block (S2207). In this case, the decoder may preform inverse transformation on the transform block, based on the transform kernel set indicated by the parsed set index (mts_idx).

On the other hand, if the coding block is an intra predicted block, the decoder may determine whether the number of non-zero transform coefficients of the transform block is 2 or less (S2209). If the number of non-zero transform coefficients of the transform block is 2 or less, the decoder may consider that the set index (mts_idx) represents "−1" (S2211). That is, the decoder may not parse the set index (mts_idx). In this case, the decoder may perform inverse transformation on the transform block by using a DCT-II-based transform kernel. On the other hand, if the number of non-zero transform coefficients in the transform block is 3 or more, the decoder may parse the set index (mts_idx) from the bitstream (S2207). In this case, the decoder may perform inverse transformation on the transform block, based on the transform kernel set indicated by the parsed set index (mts_idx).

As illustrated in FIG. 22, if the transform block of the intra predicted block has two or fewer non-zero transform coefficients, and cu_mts_flag of the transform block is 1, the decoder may consider that the set index (mts_idx) of the transform block indicates "−1" similar to a case where cu_mts_flag is 0. The decoder may preform vertical inverse transformation and horizontal inverse transformation on the transform block by using a DCT-II based transform kernel. However, this may reduce coding efficiency. Therefore, if the transform block of the intra predicted block has two or fewer non-zero transform coefficients, and cu_mts_flag of the transform block is 1, the transform kernel set may be different from the transform kernel set in the case where cu_mts_flag is 0.

FIG. 23 is a diagram illustrating a plurality of transform kernel sets according to another embodiment of the present disclosure. According to an embodiment, if a first bit (cu_mts_flag), which indicates availability of a transform kernel other than a default transform kernel, indicates that a transform kernel other than the default transform kernel cannot be used, and a set index (mts_idx) for a transform block is not signaled, it may be considered that the set index (mts_idx) indicates "−1". The set index (mts_idx) may be determined based on a color index (cIdx) of the transform block. For example, a decoder may determine whether the transform block is a luma block or a chroma block. If the transform block is a luma block (cIdx=0), it may be considered that the set index (mts_idx) indicates "0". In this case, both a horizontal transform kernel and a vertical transform kernel of the transform block may be a DST-VII-based transform kernel. On the other hand, if the transform block is a chroma block (cIdx>0), it may be considered that the set index (mts_idx) indicates "−1". In this case, both a horizontal transform kernel and a vertical transform kernel of the transform block may be DCT-II-based transform kernels.

If cu_mts_flag of the current transform block indicates that a transform kernel other than the default transform kernel can be used, and the set index (mts_idx) for the transform block is not signaled, it may be considered that the set index (mts_idx) indicates "0". In this case, both the horizontal transform kernel and the vertical transform kernel of the transform block may be DST-VII-based transform kernels.

Figures 24, 25:
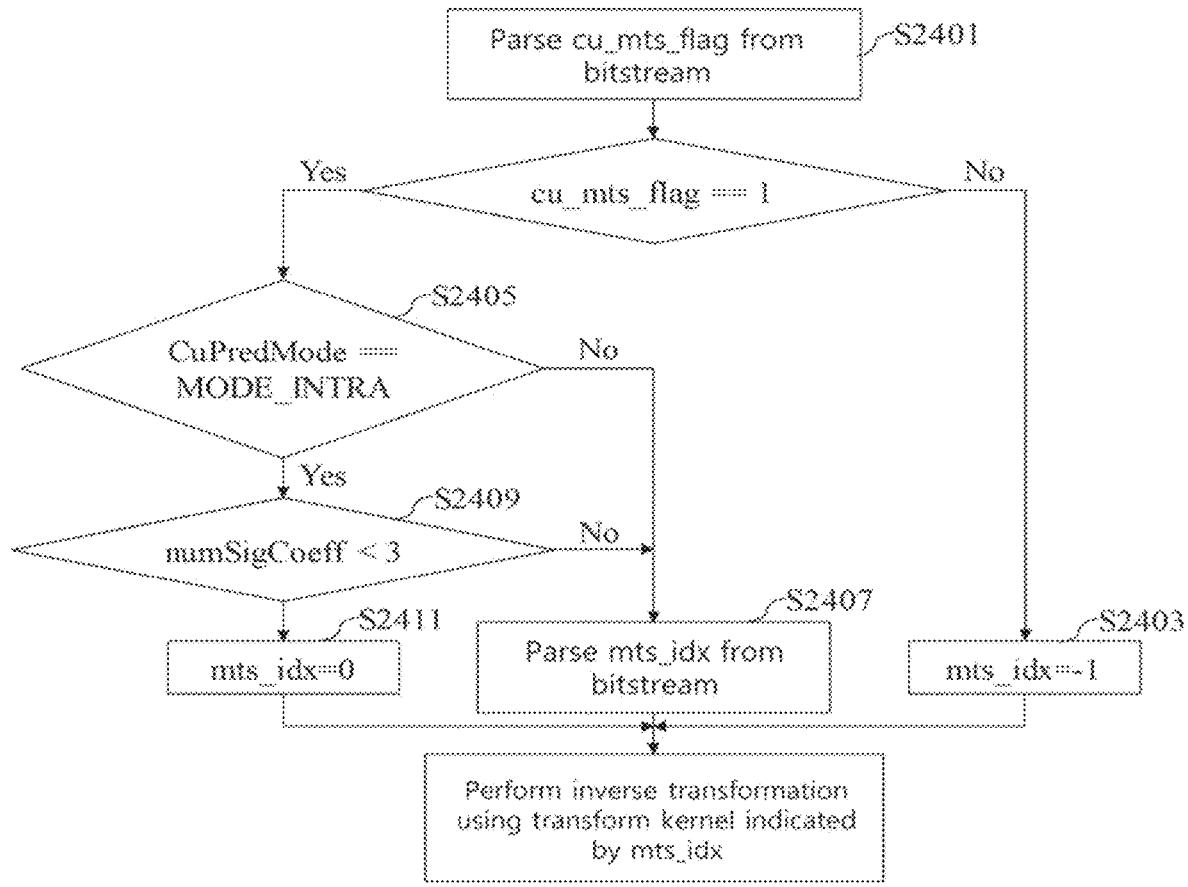
FIG. 24 is a diagram illustrating a method of determining, by a decoder, a transform kernel applied to a transform block, according to the embodiment of FIG. 23.
FIG. 25 is a diagram illustrating a plurality of transform kernel sets according to another embodiment of the present disclosure.

FIG. 24 is a diagram illustrating a method of determining, by a decoder, a transform kernel applied to a transform block, according to the embodiment of FIG. 23. First, a decoder may parse a first bit (cu_mts_flag) indicating availability of a transform kernel other than a default transform kernel, based on a received bitstream (S2401). Subsequently, if cu_mts_flag is 0, the decoder may consider that a set index indicates "−1" (S2403). In this case, the decoder may perform inverse transformation on a transform block by using a DCT-II-based transform kernel.

If cu_mts_flag is 1, the decoder may determine whether a coding block including the transform block is an intra predicted block (S2405). If the coding block is an inter predicted block that is not an intra predicted block, the decoder may parse, from the bitstream, the set index of the transform block obtained from the coding block (S2407). In this case, the decoder may perform inverse transformation on the transform block, based on the transform kernel set indicated by the parsed set index.

On the other hand, if the coding block is an intra predicted block, the decoder may determine whether the number of non-zero transform coefficients of the transform block is 2 or less (S2409). If the number of non-zero transform coefficients of the transform block is 2 or less, the decoder may consider that the set index indicates "0" (S2411). That is, the decoder may not parse the set index. In this case, the decoder may perform vertical inverse transformation and horizontal inverse transformation on the transform block by using a DST-VII-based transform kernel. On the other hand, if the number of non-zero transform coefficients in the transform block is 3 or more, the decoder may parse the set index from the bitstream (S2407). In this case, the decoder may perform inverse transformation on the transform block, based on the transform kernel set indicated by the parsed set index.

FIG. 25 is a diagram illustrating a plurality of transform kernel sets according to another embodiment of the present disclosure. According to an embodiment, if a first bit (cu_mts_flag), which indicates availability of a transform kernel other than a default transform kernel, indicates that a transform kernel other than the default transform kernel cannot be used, and a set index (mts_idx) for a transform block is not signaled, it may be considered that the set index (mts_idx) indicates "−1". The set index (mts_idx) may be determined based on a color index (cIdx) of the transform block. For example, a decoder may determine whether the transform block is a luma block or a chroma block. If the transform block is a luma block (cIdx=0), it may be considered that the set index (mts_idx) indicates "−1".

If cu_mts_flag of the current transform block indicates that a transform kernel other than the default transform kernel can be used, and the set index (mts_idx) for the transform block is not signaled, it may be considered that the set index (mts_idx) indicates "−2". In this case, both a horizontal transform kernel and a vertical transform kernel of the transform block may be DST-VII-based transform kernels. In FIG. 25, set indices are −1, 0, 1, 2, and 3, and therefore a separate transform kernel set may be configured using an index value that does not overlap with the set indices.

Figure 26:
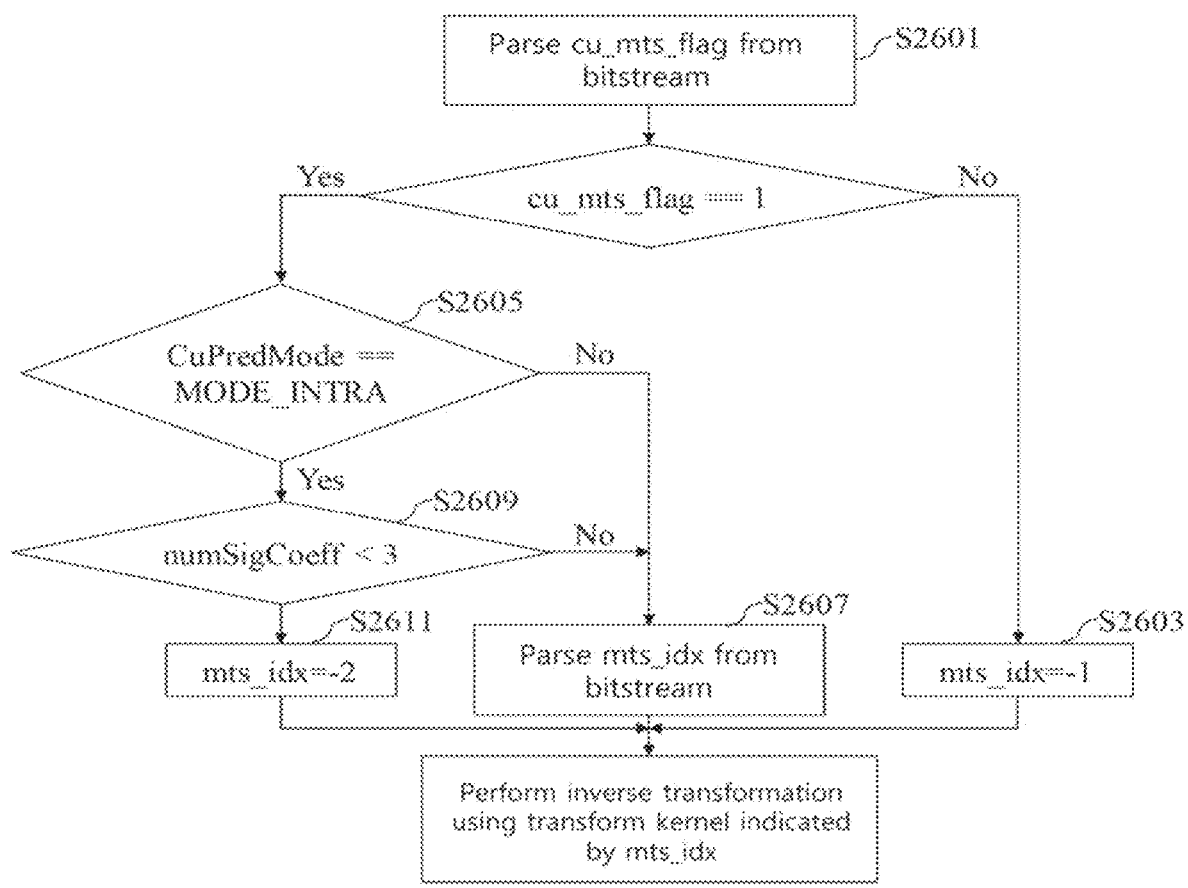
FIG. 26 is a diagram illustrating a method of determining, by a decoder, a transform kernel applied to a transform block, according to the embodiment of FIG. 25.

FIG. 26 is a diagram illustrating a method of determining, by a decoder, a transform kernel applied to a transform block, according to the embodiment of FIG. 25. First, a decoder may parse a first bit (cu_mts_flag) indicating availability of a transform kernel other than a default transform kernel, based on a received bitstream (S2601). Subsequently, if cu_mts_flag is 0, the decoder may consider that a set index indicates "−1" (S2603). In this case, the decoder may perform inverse transformation on a transform block by using a DCT-II-based transform kernel.

If cu_mts_flag is 1, the decoder may determine whether a coding block including the transform block is an intra predicted block (S2605). If the coding block is an inter predicted block that is not an intra predicted block, the decoder may parse, from the bitstream, the set index of the transform block obtained from the coding block (S2607). In this case, the decoder may perform inverse transformation on the transform block, based on the transform kernel set indicated by the parsed set index.

On the other hand, if the coding block is an intra predicted block, the decoder may determine whether the number of non-zero transform coefficients of the transform block is 2 or less (S2609). If the number of non-zero transform coefficients of the transform block is 2 or less, the decoder may consider that the set index indicates "−2" (S2611). That is, the decoder may not parse the set index. In this case, the decoder may perform vertical inverse transformation and horizontal inverse transformation on the transform block by using a DST-VII-based transform kernel. On the other hand, if the number of non-zero transform coefficients in the transform block is 3 or more, the decoder may parse the set index from the bitstream (S2607). In this case, the decoder may perform inverse transformation on the transform block, based on the transform kernel set indicated by the parsed set index.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that preforms the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A video decoding method, the method performed by an apparatus and comprising:
   obtaining a plurality of transform coefficients for residual samples of a current block, wherein the plurality of transform coefficients are two-dimensionally arranged;
   determining, based on length information of a first side of the current block, a horizontal transform kernel for horizontal transformation of the plurality of transform coefficients, regardless of a length of a second side of the current block, wherein the second side is orthogonal to the first side;
   determining, based on length information of the second side of the current block, a vertical transform kernel for vertical transformation of the plurality of transform coefficients, regardless of a length of the first side of the current block;
   obtaining the residual samples of the current block by performing, based on the plurality of transform coefficients, inverse transformation using the horizontal transform kernel and the vertical transform kernel; and
   reconstructing the current block based on the obtained residual samples,
   wherein, based on the length information of the first side and the length information of the second side having values outside a preconfigured range, the horizontal transform kernel and the vertical transform kernel are determined to be a first transform kernel,
   wherein, based on the length information of the first side and the length information of the second side having values within the preconfigured range, the horizontal transform kernel and the vertical transform kernel are determined to be a second transform kernel, and
   wherein the first transform kernel is a discrete cosine transform type 2 (DCT-2)-based transform kernel, and the second transform kernel is not the DCT-2-based transform kernel.

2. The method of claim 1,
   wherein the second transform kernel is a discrete sine transform type 7 (DST-7)-based transform kernel.

3. The method of claim 1,
   wherein the length of the first side is a width of the current block, and the length of the second side is a height of the current block.

4. The method of claim 1,
   wherein the inverse transformation using the horizontal transform kernel and the vertical transform kernel comprises first inverse transformation using the vertical transform kernel and second inverse transformation using the horizontal transform kernel.

5. A video encoding method, the method performed by an apparatus and comprising:
   obtaining a bitstream to be decoded by a decoder using a decoding method,
   wherein the decoding method comprises:
      obtaining a plurality of transform coefficients for residual samples of a current block, wherein the plurality of transform coefficients are two-dimensionally arranged;
      determining, based on length information of a first side of the current block, a horizontal transform kernel for horizontal transformation of the plurality of transform coefficients, regardless of a length of a second side of the current block, wherein the second side is orthogonal to the first side;
      determining, based on length information of the second side of the current block, a vertical transform kernel for vertical transformation of the plurality of transform coefficients, regardless of a length of the first side of the current block;
      obtaining the residual samples of the current block by performing, based on the plurality of transform coefficients, inverse transformation using the horizontal transform kernel and the vertical transform kernel; and
      reconstructing the current block based on the obtained residual samples,
      wherein, based on the length information of the first side and the length information of the second side having values outside a preconfigured range, the horizontal transform kernel and the vertical transform kernel are determined to be a first transform kernel,
      wherein, based on the length information of the first side and the length information of the second side having values within the preconfigured range, the horizontal transform kernel and the vertical transform kernel are determined to be a second transform kernel, and
      wherein the first transform kernel is a discrete cosine transform type 2 (DCT-2)-based transform kernel, and the second transform kernel is not the DCT-2-based transform kernel.

6. The method of claim 5,
   wherein the second transform kernel is a discrete sine transform type 7 (DST-7)-based transform kernel.

7. The method of claim 5,
   wherein the length of the first side is a width of the current block, and the length of the second side is a height of the current block.

8. The method of claim 5,
   wherein the inverse transformation using the horizontal transform kernel and the vertical transform kernel comprises first inverse transformation using the vertical transform kernel and second inverse transformation using the horizontal transform kernel.

9. A non-transitory computer-readable medium storing a bitstream, the bitstream being decoded by a decoding method, wherein the decoding method comprises:
- obtaining a plurality of transform coefficients for residual samples of a current block, wherein the plurality of transform coefficients are two-dimensionally arranged;
- determining, based on length information of a first side of the current block, a horizontal transform kernel for horizontal transformation of the plurality of transform coefficients, regardless of a length of a second side of the current block, wherein the second side is orthogonal to the first side;
- determining, based on length information of the second side of the current block, a vertical transform kernel for vertical transformation of the plurality of transform coefficients, regardless of a length of the first side of the current block;
- obtaining the residual samples of the current block by performing, based on the plurality of transform coefficients, inverse transformation using the horizontal transform kernel and the vertical transform kernel; and
- reconstructing the current block based on the obtained residual samples, wherein, based on the length information of the first side and the length information of the second side having values outside a preconfigured range, the horizontal transform kernel and the vertical transform kernel are determined to be a first transform kernel, wherein, based on the length information of the first side and the length information of the second side having values within the preconfigured range, the horizontal transform kernel and the vertical transform kernel are determined to be a second transform kernel, and wherein the first transform kernel is a discrete cosine transform type 2 (DCT-2)-based transform kernel, and the second transform kernel is not the DCT-2-based transform kernel.

* * * * *